United States Patent
Fujimaki et al.

(10) Patent No.: US 10,838,205 B2
(45) Date of Patent: Nov. 17, 2020

(54) HEAD MOUNTED DISPLAY, CONTROL METHOD THEREOF, AND COMPUTER PROGRAM

(71) Applicant: SEIKO EPSON CORPORATION, Tokyo (JP)

(72) Inventors: Yutaka Fujimaki, Matsumoto (JP); Masahide Takano, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 64 days.

(21) Appl. No.: 15/801,929

(22) Filed: Nov. 2, 2017

(65) Prior Publication Data
US 2018/0143433 A1 May 24, 2018

(30) Foreign Application Priority Data
Nov. 18, 2016 (JP) .................. 2016-224597

(51) Int. Cl.
G02B 27/01 (2006.01)
G06F 3/01 (2006.01)
G01C 21/34 (2006.01)
G01C 21/36 (2006.01)

(52) U.S. Cl.
CPC ....... *G02B 27/017* (2013.01); *G01C 21/3407* (2013.01); *G01C 21/365* (2013.01); *G01C 21/3652* (2013.01); *G02B 27/0172* (2013.01); *G06F 3/016* (2013.01); *G02B 2027/0141* (2013.01); *G02B 2027/0154* (2013.01); *G02B 2027/0178* (2013.01)

(58) Field of Classification Search
CPC .................. G02B 27/01; G02B 27/017; G02B 2027/0178
See application file for complete search history.

(56) References Cited

U.S. PATENT DOCUMENTS

| | | | | |
|---|---|---|---|---|
| 2016/0034035 A1* | 2/2016 | Higashino | ............... | A63F 13/65 345/156 |
| 2016/0054791 A1* | 2/2016 | Mullins | .................. | G04G 21/00 345/173 |
| 2016/0187654 A1* | 6/2016 | Border | ..................... | G02B 5/04 359/567 |
| 2017/0123503 A1* | 5/2017 | Szczerba | ............... | B60R 16/023 |

FOREIGN PATENT DOCUMENTS

JP    2014-123883 A    7/2014

* cited by examiner

*Primary Examiner* — Roy P Rabindranath
(74) *Attorney, Agent, or Firm* — Oliff PLC

(57) ABSTRACT

A head mounted display includes a plurality of vibrators disposed in a device main body which is attached to a head and includes a display unit that displays an image, and a control unit that individually controls the plurality of vibrators.

13 Claims, 18 Drawing Sheets

| VIBRATION PATTERN A | VIBRATION PATTERN B |
|---|---|
| VIBRATE LEFT-SIDE VIBRATOR ↓ INTERVAL ↓ VIBRATE FRONT-SIDE VIBRATOR ↓ INTERVAL ↓ VIBRATE RIGHT-SIDE VIBRATOR ↓ INTERVAL ↓ (REPEAT) | VIBRATE RIGHT-SIDE VIBRATOR ↓ INTERVAL ↓ VIBRATE FRONT-SIDE VIBRATOR ↓ INTERVAL ↓ VIBRATE LEFT-SIDE VIBRATOR ↓ INTERVAL ↓ (REPEAT) |

FIG.10

HEAD MOUNTED DISPLAY, CONTROL METHOD THEREOF, AND COMPUTER PROGRAM

BACKGROUND

1. Technical Field

The present invention relates to a head mounted display, a control method of a head mounted display, and a computer program.

2. Related Art

In recent years, a head mounted display is spreading which can display an image in front of the eye of a user. In the head mounted display in the related art, an area including the eyes of the user is imaged, and it is determined whether the user is in a dozing state or not based on the imaging result. When the user is in a dozing state, a warning is given to the user by sound or vibration (JP-A-2014-123883).

JP-A-2014-123883 is an example of the related art.

In the head mounted display described in JP-A-2014-123883, it is possible to notify the user whether the user is in a dozing state or not by vibrating or stopping one vibrator. However, with the head mounted display, only simple information such as whether the user is in a dozing state or not can be reported. Therefore, in head mounted display, a technique capable of making a notification of complicated information using a vibrator has been desired.

SUMMARY

An advantage of some aspects of the invention is to solve at least a part of the problems described above, and the invention can be implemented as the following configurations.

(1) According to an aspect of the invention, a head mounted display is provided. The head mounted display includes a plurality of vibrators disposed in a device main body which is attached to the head and includes a display unit that displays an image, and a control unit that individually controls the plurality of vibrators. According to the head mounted display of this aspect, complicated information that is not simple can be notified by controlling the vibrations of the plurality of vibrators disposed in the device main body.

(2) In the head mounted display, the control unit may acquire information including a direction based on the head mounted display, and control vibration patterns of the plurality of vibrators, based on the acquired information. According to the head mounted display of this aspect, the information including the direction based on the head mounted display can be notified by the plurality of vibrators. Therefore, according to the head mounted display, the notification performance to the user regarding the information including the direction can be enhanced.

(3) In the head mounted display, the information including the direction may be information on a turning corner which is obtained from a route searched by route search by a navigation device and a current position of the head mounted display. According to the head mounted display of this aspect, the turning corner of the searched route can be notified by the plurality of vibrators. Therefore, according to the head mounted display, the notification performance to the user regarding the turning angle of the searched route can be enhanced.

(4) In the head mounted display, the information including a direction may be information indicating a direction of a wireless communication device, which is obtained from a current position of the wireless communication device performing wireless communication with the head mounted display and a current position and a direction of the head mounted display. According to the head mounted display of this aspect, the direction of the current position of the person using the wireless communication device can be notified by a plurality of vibrators. Therefore, according to the head mounted display, the notification performance to the user regarding the direction of the person using the wireless communication device can be enhanced.

(5) In the head mounted display, the control unit may acquire an input operation from a user, and control vibration patterns of the plurality of vibrators, based on the acquired input operation. According to the head mounted display of this aspect, an input operation from a user can be notified by a plurality of vibrators. Therefore, the user can confirm that the input operation has been performed by vibration.

(6) In the head mounted display, the control unit may display an input screen on which a plurality of input items for receiving an input operation by a user are disposed in predetermined directions, on the display unit, and control the vibration patterns, depending on the input item which receives the input operation. According to the head mounted display of this aspect, it is possible to notify which one of the plurality of input items arranged on the input screen the input operation is performed, by using the plurality of vibrators. Therefore, the user can confirm which one of the plurality of input items the input operation is performed, by vibrations.

(7) In the head mounted display, the input operation may be an operation to switch a movement direction of the operation element, and the control unit may control the vibration pattern, in response to the movement direction. According to the head mounted display of this aspect, the input operation to switch a movement direction of the operation element by the user can be notified by the plurality of vibrators. Therefore, the user can confirm a movement direction to which the operation element is switched, by vibrations.

(8) In the head mounted display of this aspect, one of the plurality of vibrators may be provided on the right side of the center in the left-right direction of the device main body, and another one of the plurality of vibrators may be provided on the left side of the center in the left-right direction of the device main body. According to this configuration, the left and right directionality can be clearly recognized.

(9) In the head mounted display of this aspect, the device main body may have a glasses shape, one of the plurality of vibrators is provided in a nose pad part, another one of the plurality of vibrators is provided in a right-side end piece portion, and still another one of the plurality of vibrators is provided in a left-side end piece portion. According to this configuration, the left and right directionality can be clearly recognized.

(10) In the head mounted display of this aspect, the device main body may have a glasses shape, one of the plurality of vibrators may be provided in a right-side temple portion, and another one of the plurality of vibrators may be provided in a left-side temple portion. According to this configuration, the left and right directionality can be clearly recognized.

The invention can be realized in various forms other than the head mounted display. For example, the invention can be realized by a control method of a head mounted display, a computer program for realizing the function of each constituent element of the head mounted display, a recording medium on which the computer program is recorded, or the like.

BRIEF DESCRIPTION OF THE DRAWINGS

The invention will be described with reference to the accompanying drawings, wherein like numbers reference like elements.

FIG. 10 is an explanatory diagram illustrating a vibration pattern A and a vibration pattern B.

DESCRIPTION OF EXEMPLARY EMBODIMENTS

A. First Embodiment

A-1. Entire Configuration of Information Processing System

Figure 1:
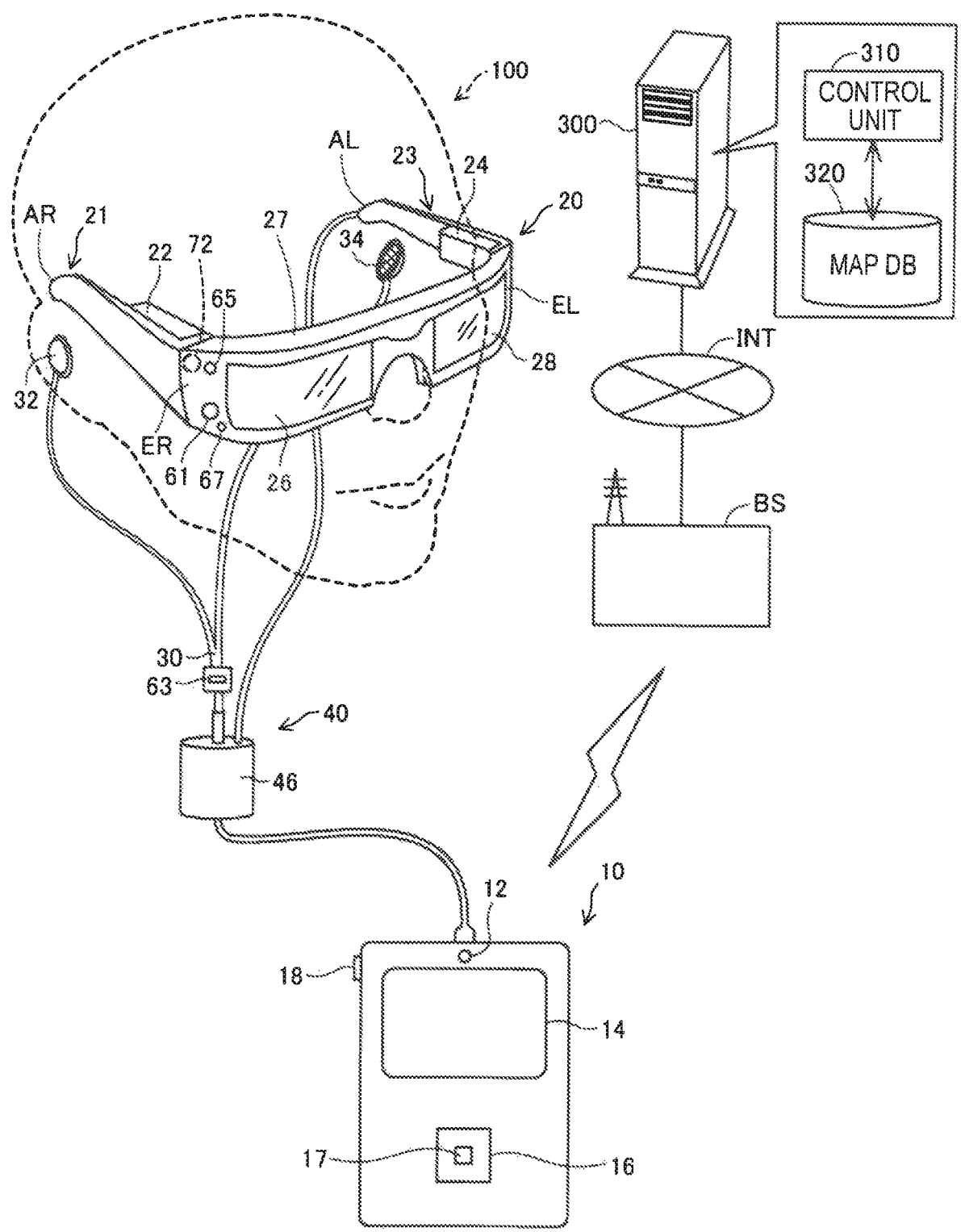
FIG. 1 is an explanatory diagram illustrating a schematic configuration of an information processing system of a first embodiment of the invention.

FIG. 1 is an explanatory diagram illustrating a schematic configuration of an information processing system of a first embodiment of the invention. An information processing system includes a head mounted display 100 and a navigation device 300. The head mounted display 100 is connected to the Internet INT by wireless communication through a communication carrier BS. The navigation device 300 is connected to the Internet INT through wired communication. As a result, the head mounted display 100 and the navigation device 300 are connected to each other through the Internet INT. The communication carrier BS includes a transmission/reception antenna, a wireless base station, and an exchange station. The details of the head mounted display 100 and the navigation device 300 will be described later.

A-2. Configuration of Head Mounted Display

The head mounted display 100 is a display mounted on the user's head, and also referred to as a Head Mounted Display (HMD). The HMD 100 is a see-through type (a transmissive type) head mounted display in which an image appears in the outside world viewed through a glass.

The HMD 100 includes an image display unit 20 that allows the user to view an image, and a control device (controller) 10 that controls the image display unit 20.

The image display unit 20 is a wearing object to be worn on the head of the user, and has a glasses shape in the present embodiment. The image display unit 20 includes a right display unit 22, a left display unit 24, a right light guide plate 26, and a left light guide plate 28, in a supporting body having a right holding unit 21, a left holding unit 23, and a front frame 27. The right display unit 22, the left display unit 24, the right light guide plate 26, and the left light guide plate 28 correspond to "display unit" in an aspect of the invention described in the "Summary of Invention" section. The image display unit 20 corresponds to "device main body" in an aspect of the invention described in the "Summary of Invention" section.

The right holding unit 21 and the left holding unit 23 respectively extend rearward from both end portions of the front frame 27, and hold the image display unit 20 on the head of the user like a temple of glasses. Among the both end portions of the front frame 27, the end portion located on the right side of the user in the state of wearing the image display unit 20 is referred to as the end portion ER, and the end portion located on the left side of the user is referred to as the end portion EL. The right holding unit 21 extends from the end portion ER of the front frame 27 to a position corresponding to the right lateral head of the user in the state of wearing the image display unit 20. The left holding unit 23 extends from the end portion EL of the front frame 27 to a position corresponding to the left lateral head of the user in the state of wearing the image display unit 20.

The right light guide plate 26 and the left light guide plate 28 are provided on the front frame 27. The right light guide plate 26 is located in front of the user's right eye in the state of wearing the image display unit 20, and causes the right eye to view an image. The left light guide plate 28 is located in front of the user's left eye in the state of wearing the image display unit 20, and causes the left eye to view an image.

The front frame 27 has a shape in which one end of the right light guide plate 26 and one end of the left light guide plate 28 are connected to each other. The connection position corresponds to the position of the middle of the forehead of the user in the state of wearing the image display unit 20. A nose pad contacting the user's nose may be provided in the front frame 27 in the state of wearing the image display unit 20, at the connection position between the right light guide plate 26 and the left light guide plate 28. In this case, the image display unit 20 can be held on the head of the user by the nose pad, the right holding unit 21, and the left holding unit 23. A belt that contacts the back of the user's head may be connected to the right holding unit 21 and the left holding unit 23 in the state of wearing the image display unit 20. In this case, the image display unit 20 can be firmly held on the user's head by the belt.

The right display unit 22 displays an image by the right light guide plate 26. The right display unit 22 is provided in the right holding unit 21, and is located in the vicinity of the right lateral head of the user in the state of wearing the image display unit 20. The left display unit 24 displays an image by the left light guide plate 28. The left display unit 24 is provided in the left holding unit 23, and is located in the vicinity of the left lateral head of the user in the state of wearing the image display unit 20. The right display unit 22 and the left display unit 24 are collectively referred to as a "display driving unit.

The right light guide plate 26 and the left light guide plate 28 of this embodiment are optical sections (for example, prisms) made of a light transmissive resin or the like, and guide the image light output by the right display unit 22 and the left display unit 24 to the eye of the user. A light control plate may be provided on the surfaces of the right light guide plate 26 and the left light guide plate 28. The light control plate is a thin plate-like optical element having different transmittance depending on the wavelength range of light, and functions as a so-called wavelength filter. For example, the light control plate is arranged so as to cover the surface of the front frame 27 (the surface opposite to the surface facing the user's eye). It is possible to adjust the transmittance of light in an arbitrary wavelength range such as visible light, infrared light, and ultraviolet light, and to adjust the light intensity of the external light incident on the right light guide plate 26 and the left light guide plate 28 from the outside and passing through the right light guide plate 26 and the left light guide plate 28, by appropriately selecting the optical characteristics of the light control plate.

The image display unit 20 guides the image light generated by the right display unit 22 and the left display unit 24 respectively to the right light guide plate 26 and the left light guide plate 28, and allows the user to view this image (augmented reality (AR) image) by this image light (this is also referred to as "displaying image".) When external light passes through the right light guide plate 26 and the left light guide plate 28 from the front of the user and is incident on the user's eye, the image light forming an image and the external light are incident on the user's eye. Therefore, the visibility of the image in the user is influenced by the strength of the external light.

Therefore, it is possible to adjust the easiness of visual recognition of an image, by attaching, for example, a light control plate to the front frame 27 and appropriately selecting or adjusting the optical characteristics of the light control plate. In a typical example, it is possible to select a light control plate having a light transmissive property of an extent that the user wearing the HMD 100 can view at least the outside scene. If the light control plate is used, an effect can be expected to protect the right light guide plate 26 and the left light guide plate 28, and reduce the damage of the right light guide plate 26 and the left light guide plate 28, adhesion of dirt thereto, or the like. The light control plate may be detachable to the front frame 27, or the right light guide plate 26 and the left light guide plate 28, respectively. The light control plate may be detachable by exchanging plural types of light control plates, or the light control plate may be omitted.

The camera 61 is disposed in the front frame 27 of the image display unit 20. The camera 61 is provided in the front surface of the front frame 27 at a position not obstructing the external light transmitting the right light guide plate 26 and the left light guide plate 28. In the example of FIG. 1, the camera 61 is disposed on the end portion ER side of the front frame 27. The camera 61 may be disposed on the end portion EL side of the front frame 27, or may be disposed at the connecting portion between the right light guide plate 26 and the left light guide plate 28.

Figure 5:
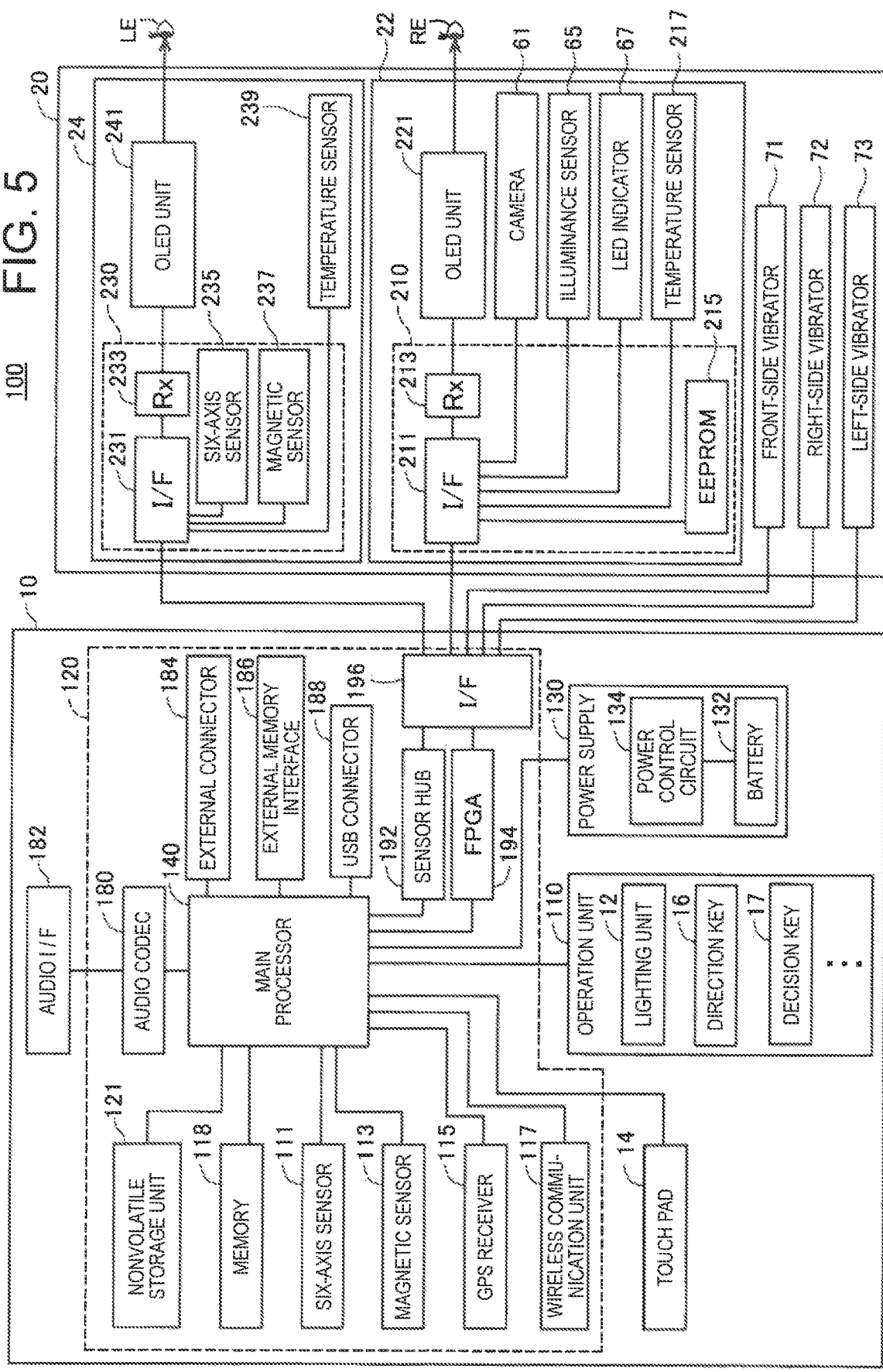
FIG. 5 is a block diagram functionally illustrating a configuration of a HMD.

The camera 61 is a digital camera including an image pickup device such as a CCD or a CMOS, an imaging lens, and the like. In the present embodiment, the camera 61 is a monocular camera, but a stereo camera may be adopted. The camera 61 captures at least a portion of outside scene (real space) in the front direction of the HMD 100, in other words, in the view direction visually recognized by the user, in the state of wearing the image display unit 20. In other words, the camera 61 captures an image in a range or a direction overlapping the field of view of the user, and captures an image in a direction viewed by the user. The size of the angle of view of the camera 61 can be set as appropriate. In the present embodiment, the size of the angle of view of the camera 61 is set such that the image of the entire field of view of the user that can be viewed through the right light guide plate 26 and the left light guide plate 28 is captured. The camera 61 performs imaging and outputs the obtained imaging data to the control function unit 150 under the control function unit 150 (FIG. 5).

The HMD 100 may be equipped with a distance sensor that detects the distance to an object to be measured located in the preset measurement direction. The distance sensor can be disposed at, for example, a connecting portion between the right light guide plate 26 and the left light guide plate 28 of the front frame 27. The measurement direction of the distance sensor can be the front direction of the MD 100 (the direction overlapping the imaging direction of the camera 61). The distance sensor can be configured with, for example, a light emitting section such as an LED, or a laser diode, and a light receiving section that receives reflected light that the light emitted from the light source reflects on the object to be measured. In this case, a distance is obtained, by a triangulation distance measurement process, or a distance measurement process based on a time difference. The distance sensor may be configured with, for example, a transmitter that emits ultrasonic waves and a receiver that receives ultrasonic waves reflected by an object to be measured. In this case, a distance is obtained, by a distance measurement process based on a time difference. Similar to the camera 61, the distance sensor is controlled by the control function unit 150, and outputs the detection result to the control function unit 150.

Figure 2:
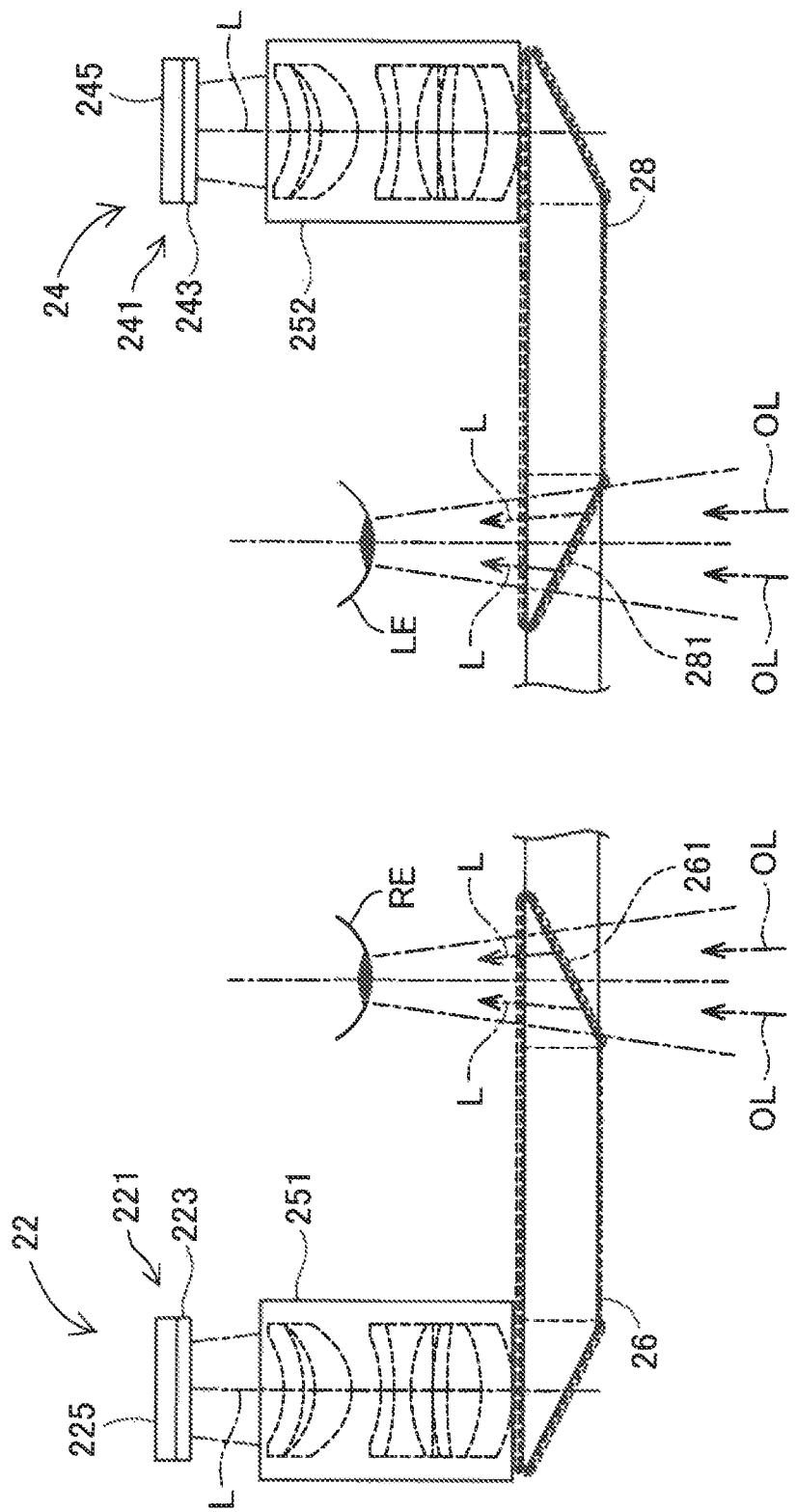
FIG. 2 is a plan view of a main part illustrating a configuration of an optical system included in an image display unit.

FIG. 2 is a plan view of a main part illustrating a configuration of an optical system included in the image display unit 20. For the convenience of explanation, FIG. 2 illustrates the right eye RE and the left eye LE of the user. As illustrated in FIG. 2, the right display unit 22 and the left display unit 24 are configured symmetrically to the left and right.

The right display unit 22 includes an organic light emitting diode (OLED) unit 221, and a right optical system 251 as a configuration for allowing the right eye RE to view an image (AR image). The OLED unit 221 emits image light. The right optical system 251 includes a lens group, and guides an image light L emitted from the OLED unit 221 to the right light guide plate 26.

The OLED unit 221 includes an OLED panel 223, and an OLED drive circuit 225 that drives the OLED panel 223. The OLED panel 223 is a self-emitting display panel configured with light emitting elements that emit light by organic electroluminescence, and emit color lights of red (R), green (G), and blue (B), respectively. In the OLED panel 223, a plurality of pixels are arranged in a matrix, each pixel having respectively one R, one G, and one B element.

The OLED drive circuit 225 selects light emitting elements and supplies of power to the light emitting elements included in the OLED panel 223 under the control of the control function unit 150 (FIG. 5), and causes the light emitting element to emit light. The OLED drive circuit 225 is fixed to the back surface of the OLED panel 223, that is, the back side of the light emitting surface by bonding or the like. The OLED drive circuit 225 may be configured with, for example, a semiconductor device that drives the OLED panel 223, and may be mounted on the substrate fixed to the back surface of the OLED panel 223. A temperature sensor 217 (FIG. 5) which will be described later is mounted on the substrate. In addition, the OLED panel 223 may have a configuration in which light emitting elements that emit white light are arranged in a matrix and color filters corresponding to the respective colors R, G, and B are superimposed and arranged. An OLED panel 223 having a WRGB configuration may be adopted in which a light emitting element that emits light of W (white) is provided in addition to the light emitting elements that emit respective colors R, G, and B.

The right optical system 251 includes a collimating lens that makes the image light L emitted from the OLED panel 223 into a parallel light flux. The image light L made into the parallel light flux by the collimating lens enters the right light guide plate 26. A plurality of reflecting surfaces reflecting the image light L are formed in the light path guiding the light inside the right light guide plate 26. The image light L is guided to the right eye RE side by being subjected to a plurality of times of reflections inside the right light guide plate 26. A half mirror 261 (reflective surface) located in front of the right eye RE is formed on the right light guide plate 26. After being reflected by the half mirror 261, the image light L is emitted from the right light guide plate 26 to the right eye RE, and this image light L forms an image on the retina of the right eye RE, thereby allowing the user to view the image.

The left display unit 24 includes an OLED unit 241 and a left optical system 252, as a configuration allowing the left eye LE to view an image (AR image). The OLED unit 241 emits image light. The left optical system 252 includes a lens group, and guides the image light L emitted from the OLED unit 241 to the left light guide plate 28. The OLED unit 241 includes an OLED panel 243, and an OLED drive circuit 245 that drives the OLED panel 243. The details of the respective parts are the same as those of the OLED unit 221, the OLED panel 223, and the OLED drive circuit 225. A temperature sensor 239 is mounted on the substrate fixed to the back surface of the OLED panel 243. The details of the left optical system 252 are the same as those of the right optical system 251.

According to the above-described configuration, the HMD 100 can function as a see-through type display device. In other words, the image light L reflected by the half mirror 261 and the external light OL passing through the right light guide plate 26 are incident on the user's right eye RE. The image light L reflected by the half mirror 281 and the external light OL passing through the left light guide plate 28 are incident on the user's left eye LE. The HMD 100 superimposes the image light L of the internally processed image and the external light OL each other to be incident on the eye of the user. As a result, the outside scene (real world) is visible through the right light guide plate 26 and the left light guide plate 28, and an image (AR image) by the image light L is viewed by the user so as to be superimposed on this outside scene.

The half mirror 261 and the half mirror 281 each function as "an image pickup unit" that reflects the image light output from each of the right display unit 22 and the left display unit 24 and extracts the image. The right optical system 251 and the right light guide plate 26 are collectively referred to as "a right light guide portion", and the left optical system 252 and the left light guide plate 28 are also referred to as "a left light guide portion." The configurations of the right light guide portion and the left light guide portion are not limited to the above example, and an arbitrary method can be used as long as an image is formed in front of the eye of the user using image light. For example, diffraction gratings may be used, or transflective films may be used, for the right light guide portion and the left light guide portion.

In FIG. 1, the control device 10 and the image display unit 20 are connected by a connection cable 40. The connection cable 40 is detachably connected to a connector provided at the bottom of the control device 10, and is connected from the tip AL of the left holding unit 23 to various circuits inside the image display unit 20. The connection cable 40 has a metal cable or an optical fiber cable for transmitting digital data. The connection cable 40 may further include a metal cable for transmitting analog data. A connector 46 is provided in the middle of the connection cable 40.

The connector 46 is a jack for connecting a stereo mini plug, and the connector 46 and the control device 10 are connected by, for example, a line for transferring analog audio signals. In the example of the present embodiment illustrated in FIG. 1, a right earphone 32 and a left earphone 34 constituting a stereo headphone and a head set 30 having a microphone 63 are connected to the connector 46.

For example, the microphone 63 is arranged so that the sound pickup portion of the microphone 63 faces the user's line-of-sight direction, as illustrated in FIG. 1. The microphone 63 picks up audio and outputs the audio signal to the audio interface 182 (FIG. 5). The microphone 63 may be a monaural microphone or a stereo microphone, or may be a directional microphone or an omnidirectional microphone.

The control device 10 is a device that controls the HMD 100. The control device 10 includes a lighting unit 12, a touch pad 14, a direction key 16, a decision key 17, and a power switch 18. The lighting unit 12 notifies of the operation state (for example, power ON/OFF, or the like) of the HMD 100 by its light emission mode. For example, a light emitting diode (LED) can be used as the lighting unit 12.

The touch pad 14 detects a touch operation on the operation surface of the touch pad 14, and outputs a signal corresponding to the detection content. Various touch pads such as an electrostatic type, a pressure detection type, and an optical type may be adopted as the touch pad 14. When a pressing operation to the key corresponding to each of up, down, right, and left directions of the direction key 16 is detected, a signal corresponding to the detected contents is output. When a press operation of the decision key 17 is detected, a signal for deciding the content operated in the control device 10 is output. When the slide operation of the power switch 18 is detected, the power-on-off state of the HMD 100 is switched.

Figure 3:
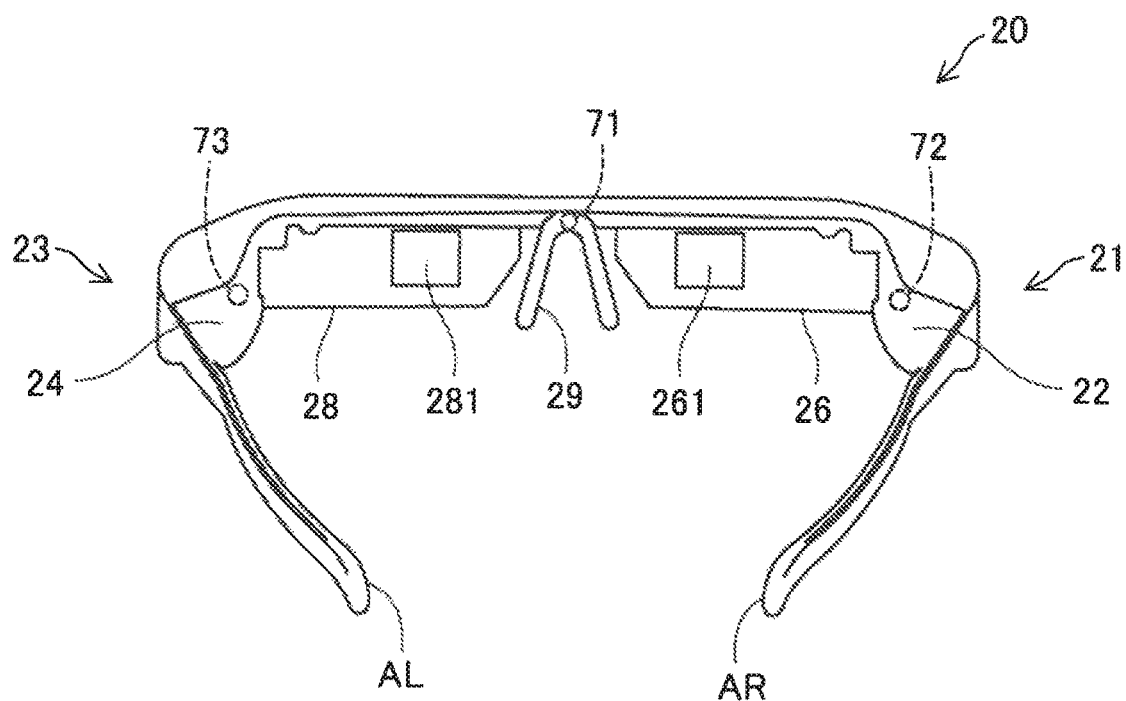
FIG. 3 is a diagram illustrating a configuration of main parts of the image display unit viewed from a user.

FIG. 3 is a diagram illustrating a configuration of the main parts of the image display unit 20 viewed from the user. In FIG. 3, the illustration of the connection cable 40, the right earphone 32, and the left earphone 34 is omitted. In the state of FIG. 3, the back sides of the right light guide plate 26 and the left light guide plate 28 are visible, and the half mirror 261 illuminating the image light to the right eye RE and the half mirror 281 illuminating the image light to the left eye LE are visible as substantially rectangular areas. The user views the outside scene through the whole of the left and right light guide plates 26 and 28 including the half mirrors 261 and 281, and views a rectangular display image at the positions of the half mirrors 261 and 281.

Figure 4:
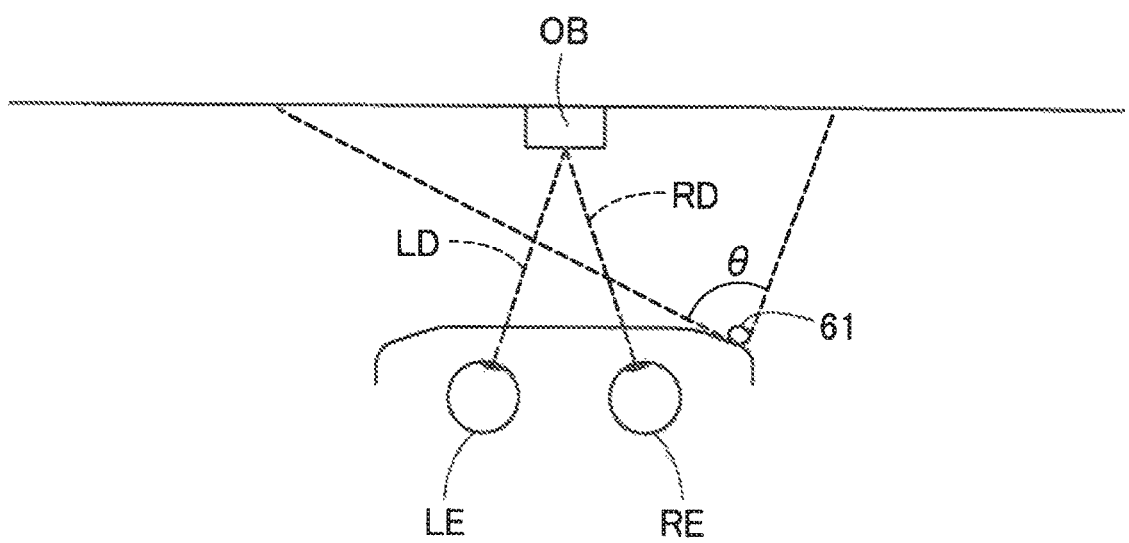
FIG. 4 is a diagram illustrating an angle of view of a camera.

FIG. 4 is a diagram illustrating an angle of view of the camera 61. In FIG. 4, the camera 61 and the user's right eye RE and left eye LE are schematically illustrated in a plan view, and the angle of view (imaging range) of the camera 61 is denoted by θ. The angle θ of view of the camera 61 extends in the horizontal direction as illustrated in FIG. 4, and also extends in the vertical direction similar to a general digital camera.

As described above, the camera 61 is disposed at the end portion on the right side of the image display unit 20, and captures an image in the line-of-sight direction of the user (that is, the front of the user). Therefore, the optical axis of the camera 61 is in a direction including the line-of-sight directions of the right eye RE and the left eye LE. The outside scene that the user can view in the state of wearing the HMD 100 is not limited to infinity. For example, when the user gazes at the object OB with both eyes, the line of sight of the user is directed to the object OB as indicated by reference symbols RD and LD in FIG. 4. In this case, the distance from the user to the object OB is likely to be about 30 cm to 10 m, and is more likely to be 1 m to 4 m. Therefore, a measure of the upper limit and the lower limit of the distance from the user to the object OB at the time of normal use may be set for the HMD 100. This measure may be determined in advance and pre-set in the HMD 100, or may be set by the user. It is preferable that the optical axis and the angle of view of the camera 61 are set such that the object OB is included in the angle of view when the distance to the object OB at the time of normal use corresponds to the measure of the upper limit and the lower limit.

In general, the viewing angle of a human being is set to about 200 degrees in the horizontal direction and about 125 degrees in the vertical direction. Among them, the effective visual field with excellent information reception ability is 30 degrees in the horizontal direction and about 20 degrees in the vertical direction. A stable field of fixation in which a gaze point gazed at by humans seems promptly stable is in a range of 60 to 90 degrees in the horizontal direction and 45 to 70 degrees in the vertical direction. In this case, if the gazing point is an object OB (FIG. 4), the effective field of view is about 30 degrees in the horizontal direction and about 20 degrees in the vertical direction with the lines of sight RD and LD as the center. The stable field of fixation is 60 to 90 degrees in the horizontal direction and about 45 to 70 degrees in the vertical direction. The actual field of view that is viewed through the image display unit 20 and then through the right light guide plate 26 and the left light guide plate 28 by users is referred to as the field of view (FOV). The actual field of view is narrower than the viewing angle and stable field of fixation, but wider than the effective field of view.

The angle θ of view of the camera 61 of the present embodiment is set such that a wider range than the user's field of view can be captured. It is preferable that the angle θ of view of the camera 61 is set such that a wider range than at least the user's effective field of view can be captured, or a wider range than the actual field of view can be captured. It is preferable that the angle θ of view of the camera 61 is set such that a wider range than the user's stable field of fixation can be captured, or a wider range than the viewing angle of both eyes of the user can be captured. Therefore, a so-called wide-angle lens is provided as an imaging lens in the camera 61, and a configuration may be possible which is capable of capturing a wide angle of view. The wide-angle lens may include a super wide-angle lens and a lens called a quasi-wide-angle lens. Further, the camera 61 may include a single focus lens, may include a zoom lens, or may include a lens group including a plurality of lenses.

FIG. 5 is a block diagram functionally illustrating the configuration of the HMD 100. The control device 10 includes a main processor 140 that controls the HMD 100 by executing a program, a storage unit, an input/output unit, sensors, an interface, and a power supply 130. The storage unit, the input/output unit, the sensors, the interface, and the power supply 130 are respectively connected to the main processor 140. The main processor 140 is mounted on the controller substrate 120 including the built-in control device 10.

The storage unit includes a memory 118 and a nonvolatile storage section 121. The memory 118 forms a work area for temporarily storing the computer program executed by the main processor 140, and data to be processed. The nonvolatile storage section 121 is configured with a flash memory or an embedded multimedia card (eMMC). The nonvolatile storage section 121 stores the computer program executed by the main processor 140 and various data processed by the main processor 140. In the present embodiment, these storage units are mounted on the controller substrate 120.

The input/output unit includes a touch pad 14, and an operation unit 110. The operation unit 110 includes a direction key 16, a decision key 17, and a power switch 18, which are included in the control device 10. The main processor 140 controls each input/output unit, and acquires a signal output from each input/output unit.

The sensors include a six-axis sensor 111, a magnetic sensor 113, and a global positioning system (GPS) receiver 115. The six-axis sensor 111 is a motion sensor (inertial sensor) equipped with a three-axis acceleration sensor and a three-axis gyro (angular velocity) sensor. The six-axis sensor 111 may adopt an inertial measurement unit (IMU) in which these sensors are modularized. The magnetic sensor 113 is, for example, a three-axis geomagnetic sensor. The GPS receiver 115 includes a GPS antenna not illustrated, receives radio signals transmitted from the GPS satellite, and detects the coordinates of the current position of the control device 10. The sensors (the six-axis sensor 111, the magnetic sensor 113, and the GPS receiver 115) output the detection value to the main processor 140 according to the sampling frequency designated in advance. The timing at which each sensor outputs the detection value may be determined in accordance with an instruction from the main processor 140.

Interfaces include a wireless communication section 117, an audio codec 180, an external connector 184, an external memory interface 186, a universal serial bus (USB) connector 188, a sensor hub 192, an FPGA 194, and an interface 196. They function as interfaces with the outside. The wireless communication section 117 performs wireless communication between the HMD 100 and the external device. The wireless communication section 117 is configured with an antenna, an RF circuit, a baseband circuit, a communication control circuit, and the like which are not illustrated, or is configured as a device in which these are integrated. The wireless communication section 117 performs wireless communication conforming to the standards of a wireless LAN including, for example, Bluetooth (registered trademark), Wi-Fi (registered trademark), or the like.

The audio codec 180 is connected to the audio interface 182, and encodes/decodes an audio signal which is input/output through the audio interface 182. The audio interface 182 is an interface that inputs and outputs an audio signal. The audio codec 180 may include an A/D converter that converts an analog audio signal to digital audio data and a D/A converter that performs the reverse conversion thereof. The HMD 100 of the present embodiment outputs audio from the right earphone 32 and the left earphone 34, and collects it by the microphone 63. The audio codec 180 converts a digital audio data output by the main processor 140 into an analog audio signal, and outputs it through the audio interface 182. The audio codec 180 converts an analog audio signal input to the audio interface 182 into digital audio data, and outputs it to the main processor 140.

The external connector 184 is a connector for connecting an external device (for example, a personal computer, a smart phone, a game machine, or the like) that communicates with the main processor 140, to the main processor 140. The external device connected to the external connector 184 can serve as a source of contents, and can be used for debugging the computer program executed by the main processor 140, or for collecting operation logs of the HMD 100. The external connector 184 can adopt various aspects. The external connector 184 can adopt, for example, an interface corresponding to wired connection such as a USB interface, a micro-USB interface, and a memory card interface, or an interface corresponding to the wireless connection such as a wireless LAN interface, or a Bluetooth interface.

The external memory interface 186 is an interface to which a portable memory device can be connected. The external memory interface 186 includes, for example, a memory card slot loaded with a card type recording medium for reading and writing data, and an interface circuit. The size, shape, standard, or the like of the card-type recording medium can be appropriately selected. The USB connector 188 is an interface for connecting a memory device, a smart phone, a personal computer, or the like, conforming to the USB standard.

The USB connector 188 includes, for example, a connector conforming to the USB standard, and an interface circuit. The size and shape of the USB connector 188, the version of the USB standard, or the like can be selected as appropriate.

The sensor hub 192 and the FPGA 194 are connected to the image display unit 20 through an interface (I/F) 196. The sensor hub 192 acquires the detection values of the various sensors provided in the image display unit 20, and outputs them to the main processor 140. The FPGA 194 processes data transmitted and received between the main processor 140 and each part of the image display unit 20 and transfers it through the interface 196. The interface 196 is connected to the right display unit 22 and the left display unit 24 of the image display unit 20, respectively. In the example of the present embodiment, the connection cable 40 is connected to the left holding unit 23, and the wiring linked to the connection cable 40 is connected to the inside of the image display unit 20, the right display unit 22 and the left display unit 24 are connected to the interface 196 of the control device 10, respectively.

The power supply 130 includes a battery 132, and a power control circuit 134. The power supply 130 provides power to operate the control device 10. The battery 132 is a rechargeable battery. The power control circuit 134 detects the remaining capacity of the battery 132 and controls the charging to an OS 143. The power control circuit 134 is connected to the main processor 140, and outputs the detected value of the remaining capacity of the battery 132 and the detected value of the voltage of the battery 132 to the main processor 140. Power may be supplied from the control device 10 to the image display unit 20, based on the electric power supplied by the power supply 130. It may be configured such that the state of the supply of power from the power supply 130 to each part of the control device 10 and the image display unit 20 is controlled by the main processor 140.

The right display unit 22 includes a display unit substrate 210, an OLED unit 221, a camera 61, an illuminance sensor 65, an LED indicator 67, and a temperature sensor 217. An interface (I/F) 211 connected to the interface 196, a receiver (Rx) 213, and an electrically erasable programmable read-only memory (EEPROM) 215 are mounted on the display unit substrate 210. The receiver 213 receives data input from the control device 10 through the interface 211. When receiving the image data of the image displayed by the OLED unit 221, the receiver 213 outputs the received image data to the OLED drive circuit 225 (FIG. 2).

The EEPROM 215 stores various types of data in such a manner that the main processor 140 can read the data. The EEPROM 215 stores, for example, data about the light emission characteristics and the display characteristics of the OLED units 221 and 241 of the image display unit 20, data about the sensor characteristics of the right display unit 22 and the left display unit 24, and the like. Specifically, it stores, for example, parameters relating to gamma correction of the OLED units 221 and 241, data for compensating the detection values of the temperature sensors 217 and 239, and the like. These data are generated by factory shipment inspection of the HMD 100 and written in the EEPROM 215. After shipment, the main processor 140 reads the data of the EEPROM 215 and uses it for various processes.

The camera 61 implements imaging according to the signal input through the interface 211, and outputs imaging image data or a signal indicating an imaging result to the control device 10. As illustrated in FIG. 1, the illuminance sensor 65 is provided at the end portion ER of the front frame 27, and is disposed to receive external light from the front of the user wearing the image display unit 20. The illuminance sensor 65 outputs a detection value corresponding to the amount of received light (received light intensity). As illustrated in FIG. 1, the LED indicator 67 is disposed in the vicinity of the camera 61 at the end portion ER of the front frame 27. The LED indicator 67 is lit up during imaging by the camera 61 and notifies that the image is being captured.

The temperature sensor 217 detects the temperature and outputs a voltage value or a resistance value corresponding to the detected temperature. The temperature sensor 217 is mounted on the back side of the OLED panel 223 (FIG. 3). The temperature sensor 217 may be mounted on, for example, the same substrate as that of the OLED drive circuit 225. With this configuration, the temperature sensor 217 mainly detects the temperature of the OLED panel 223. The temperature sensor 217 may be incorporated in the OLED panel 223 or the OLED drive circuit 225. When the OLED panel 223 is, for example, a Si-OLED, and the OLED panel 223 and the OLED drive circuit 225 are mounted as an integrated circuit on an integrated semiconductor chip, the temperature sensor 217 may be mounted on the semiconductor chip.

The left display unit 24 includes a display unit substrate 230, an OLED unit 241, and a temperature sensor 239. An interface (I/F) 231 connected to the interface 196, a receiver (Rx) 233, a six-axis sensor 235, and a magnetic sensor 237 are mounted on the display unit substrate 230. The receiver 233 receives data input from the control device 10 through the interface 231. When receiving the image data of the image displayed by the OLED unit 241, the receiver 233 outputs the received image data to the OLED drive circuit 245 (FIG. 2).

The six-axis sensor 235 is a motion sensor (inertial sensor) equipped with a three-axis acceleration sensor and a three-axis gyro (angular velocity) sensor. An IMU in which the above sensors are modularized may be adopted as the six-axis sensor 235. The magnetic sensor 237 is, for example, a three-axis geomagnetic sensor. Since the six-axis sensor 235 and the magnetic sensor 237 are provided in the image display unit 20, when the image display unit 20 is mounted on the head of the user, the movement of the head of the user is detected. The orientation of the image display unit 20, that is, the field of view of the user is specified based on the detected movement of the head.

The temperature sensor 239 detects the temperature and outputs a voltage value or a resistance value corresponding to the detected temperature. The temperature sensor 239 is mounted on the back side of the OLED panel 243 (FIG. 3). The temperature sensor 239 may be mounted on, for example, the same substrate as that of the OLED drive circuit 245. With this configuration, the temperature sensor 239 mainly detects the temperature of the OLED panel 243. The temperature sensor 239 may be incorporated in the OLED panel 243 or the OLED drive circuit 245. The details are the same as those of the temperature sensor 217.

In addition, the image display unit 20 includes three vibrators 71 to 73 (71 and 73 are shown in FIG. 3). Each of the vibrators 71 to 73 includes a motor which is not illustrated, an eccentric rotor, and the like, and generates vibrations under the control of the control device 10. The control device 10 individually controls each of the vibrators 71 to 73. In the present embodiment, the vibration frequency is set to 250 Hz or less, which is highly sensitive to the human body. The vibration intensity is adjusted such that the skin displacement of the contact portion is 0.1 μm or more. The disposed positions and the modes of vibration of the vibrators 71 to 73 in the image display unit 20 will be described later in detail. Each of the vibrators 71 to 73 corresponds to "vibrator" in an aspect of the invention described in the "Summary of Invention" section.

The camera 61, the illuminance sensor 65, and the temperature sensor 217 of the right display unit 22, and the six-axis sensor 235, the magnetic sensor 237, and the temperature sensor 239 of the left display unit 24 are connected to the sensor hub 192 of the control device 10. The sensor hub 192 sets and initializes the sampling period of each sensor under the control of the main processor 140.

The sensor hub 192 supplies power to each sensor, transmits control data, acquires a detection value, or the like, in accordance with the sampling period of each sensor. The sensor hub 192 outputs the detection value of each sensor provided in the right display unit 22 and the left display unit 24 to the main processor 140 at a preset timing. The sensor hub 192 may be provided with a cache function of temporarily holding the detection value of each sensor. The sensor hub 192 may be provided with a conversion function of a signal format or a data format of the detection value of each sensor (for example, a conversion function into a unified format).

An FPGA 194 starts or stops supply of power to the LED indicator 67 under the control of the main processor 140 to turn on or off the LED indicator 67. In addition, the FPGA 194 vibrates or stops the vibrators 71 to 73 by starting or stopping supply of power to the vibrators 71 to 73 under the control of the main processor 140.

Returning to FIG. 3, the disposed positions of the three vibrators 71 to 73 provided in the image display unit 20 will be described. As shown in FIG. 3, the three vibrators 71 to 73 are disposed on the front side, right side and left side as seen from the user. Specifically, the front-side vibrator 71 is embedded in the nose pad 29. Specifically, the front-side vibrator 71 is embedded in a central portion of the nose pad 29, that is, a portion between a left arm portion 29a and a right arm portion 29a.

The right-side vibrator 72 is embedded in the right end portion ER of the front frame 27 (the right-side end piece portion of the eyeglasses in a case of eyeglasses). The left-side vibrator 73 is embedded in a left end portion EL of the front frame 27 (the left-side end piece portion in a case of eyeglasses). The right-side vibrator 72 may be provided near the tip AR of the right holding unit 21 (a temple portion on the right side in a case of eyeglasses) instead of the end portion ER. The left-side vibrator 73 may be provided near the tip AL of the left holding unit 23 (a temple portion on the left side in a case of eyeglasses) instead of the end portion EL.

Figure 6:
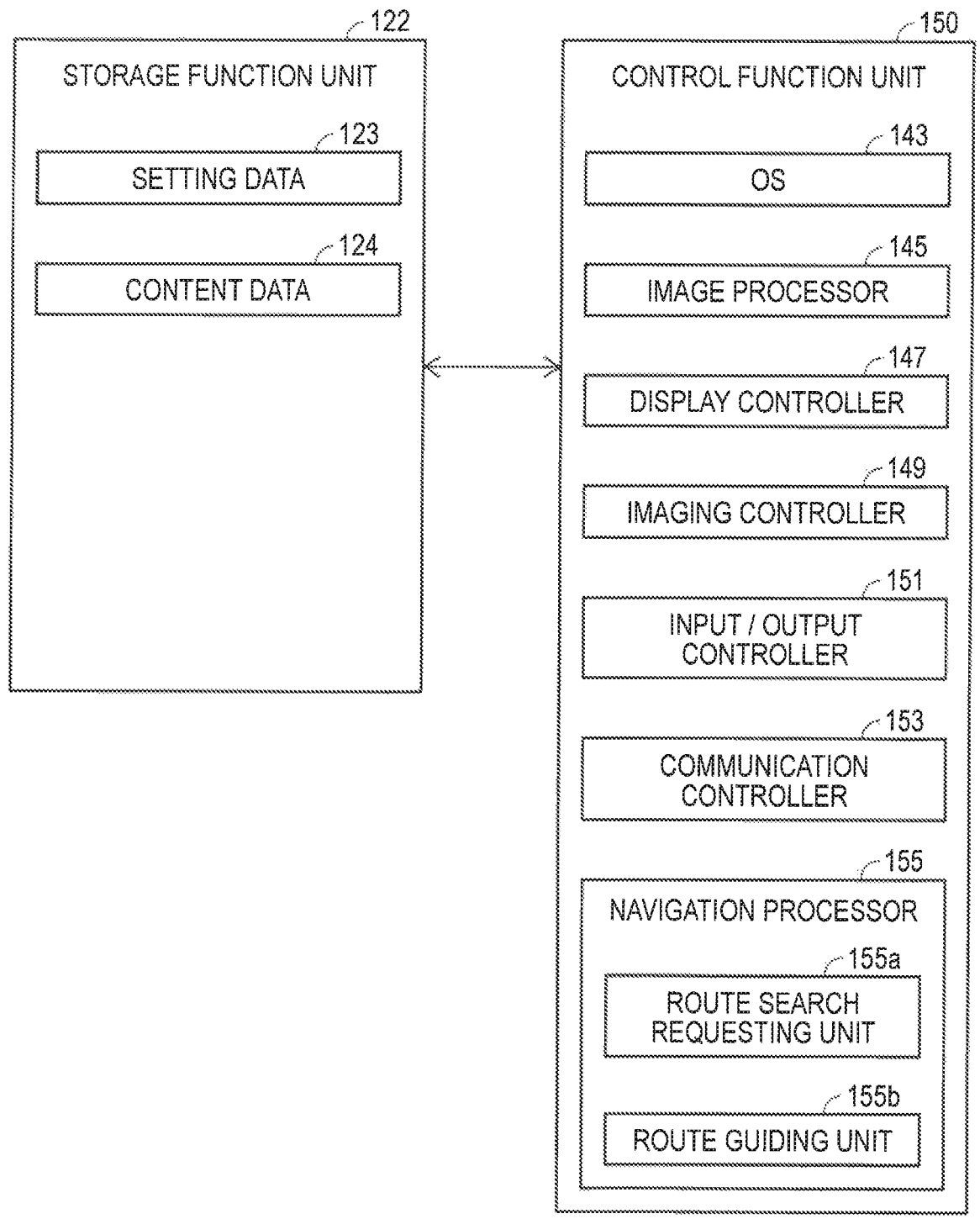
FIG. 6 is a block diagram functionally illustrating a configuration of a control device.

FIG. 6 is a block diagram functionally illustrating the configuration of the control device 10. The control device 10 functionally includes a storage function unit 122, and a control function unit 150. The storage function unit 122 is a logical storage unit configured with the nonvolatile storage section 121 (FIG. 5). Instead of the configuration of only using the storage function unit 122, a configuration may be possible such that the storage function unit 122 is combined with the nonvolatile storage section 121, and the EEPROM 215 or the memory 118 is used. The control function section 150 is configured by the main processor 140 executing a computer program, that is, by cooperation of hardware and software.

The storage function unit 122 stores various data to be processed in the control function unit 150. Specifically, the setting data 123 and the content data 124 are stored in the storage function unit 122 of the present embodiment. The setting data 123 includes various setting values related to the operation of the HMD 100. For example, the setting data 123 includes parameters, a determinant, an arithmetic expression, and a look up table (LUT) when the control function unit 150 controls the HMD 100.

The content data 124 includes data (image data, video data, audio data, or the like) of contents including image and video displayed by the image display unit 20 under the control of the control function unit 150. Data of bidirectional type content may be included in the content data 124. The bidirectional type content means a content of a type in which the operation of the user is acquired by the operation unit 110, the process corresponding to the acquired operation content is performed by the control function unit 150, and content corresponding to the processed content is displayed on the image display unit 20. In this case, content data includes image data of a menu screen for acquiring user's operation, data defining a process corresponding to items included in the menu screen, and the like.

The control function unit 150 executes functions as an OS 143, an image processor 145, a display controller 147, an imaging controller 149, an input/output controller 151, a communication controller 153, and a navigation processor 155, by executing various processes using the data stored in the storage function unit 122. In the present embodiment, each functional unit other than the OS 143 is configured as a computer program executed on the OS 143.

The image processor 145 generates signals to be transmitted to the right display unit 22 and the left display unit 24, based on an image/image data of video displayed by the image display unit 20. The signals generated by the image processor 145 may be a vertical sync signal, a horizontal sync signal, a clock signal, an analog image signal, and the like. The image processor 145 may be configured with hardware (for example, a digital signal processor (DSP)) other than the main processor 140, in addition to the configuration realized by the main processor 140 executing the computer program.

The image processor 145 may execute a resolution conversion process, an image adjustment process, a 2D/3D conversion process, or the like, as necessary. The resolution conversion process is a process of converting the resolution of the image data into a resolution suitable for the right display unit 22 and the left display unit 24. The image adjustment process is a process of adjusting the brightness and saturation of image data. The 2D/3D conversion process is a process of generating two-dimensional image data from three-dimensional image data, or generating three-dimensional image data from two-dimensional image data. When executing these processes, the image processor 145 generates a signal for displaying an image based on the processed image data, and transmits it to the image display unit 20 through the connection cable 40.

The display controller 147 generates a control signal for controlling the right display unit 22 and the left display unit 24, and controls the generation and emission of image light by each of the right display unit 22 and the left display unit 24, according to this control signal. Specifically, the display controller 147 controls the OLED drive circuits 225 and 245 so as to display images by the OLED panels 223 and 243. The display controller 147 controls the timing at which the OLED drive circuits 225 and 245 perform drawing on the OLED panels 223 and 243, and controls the brightness of the OLED panels 223 and 243, based on the signal output from the image processor 145.

The imaging controller 149 controls the camera 61 so as to perform imaging, generates imaging image data, and temporarily stores it in the storage function unit 122. If the camera 61 is configured with a camera unit including a circuit that generates imaging image data, the imaging controller 149 acquires the imaging image data from the camera 61 and temporarily stores it in the storage function unit 122.

The input/output controller 151 appropriately controls the touch pad 14 (FIG. 1), the direction key 16, and the decision key 17, and acquires an input command therefrom. The acquired command is output to the OS 143, or the OS 143 and the computer program operating on the OS 143. Further, upon receiving an instruction from the navigation processor 155, the input and output control unit 151 generates a control signal for controlling each of the vibrators 71 to 73, and vibrates each of the vibrators 71 to 73 by the control signal. The communication controller 153 controls the wireless communication section 117 so as to perform wireless communication with, for example, the navigation device 300.

A navigation processor 155 is a function realized according to an application program operating on the OS 143. The navigation processor 155 cooperates with the input and output control unit 151, or all the image processor 145, the display controller 147, and the input and output control unit 151 to guide a route from a departure to a destination. Specifically, the navigation processor 155 implements a function as a route search requesting unit 155*a* for requesting the navigation device 300 for a route search, and a function as a route guiding unit 155*b* for guiding a route sent from the navigation device 300. The route search requesting unit 155*a* sends a route search request including a departure (for example, a current location) and a destination which are input by the user to the navigation device 300. The route guiding unit 155*b* causes the image processor 145 to display the route sent from the navigation device 300, and causes the input and output control unit 151 to generate control signals for controlling each of the vibrators 71 to 73. The route guiding unit 155*b* will be described later in detail.

A-3. Configuration of Navigation Device

As shown in FIG. 1, the navigation device 300 includes a control unit 310 and a map database 320. The map database 320 stores road network data in which road connection states are represented by nodes representing intersections and dead ends and links representing roads.

The control unit 310 includes a CPU and a memory, and controls the entire operation of the navigation device 300. The control unit 310 executes the route search by the CPU executing the computer program stored in the memory. Specifically, when the route search request is received from the HMD 100 through the Internet INT, the control unit 310 performs a route search by using the well-known Dijkstra method, based on the road network data stored in the map database 320. Then, the route information indicating the searched route is transmitted to the HMD 100 through the Internet INT.

A-4. With Respect to Augmented Reality Display

Figure 7:
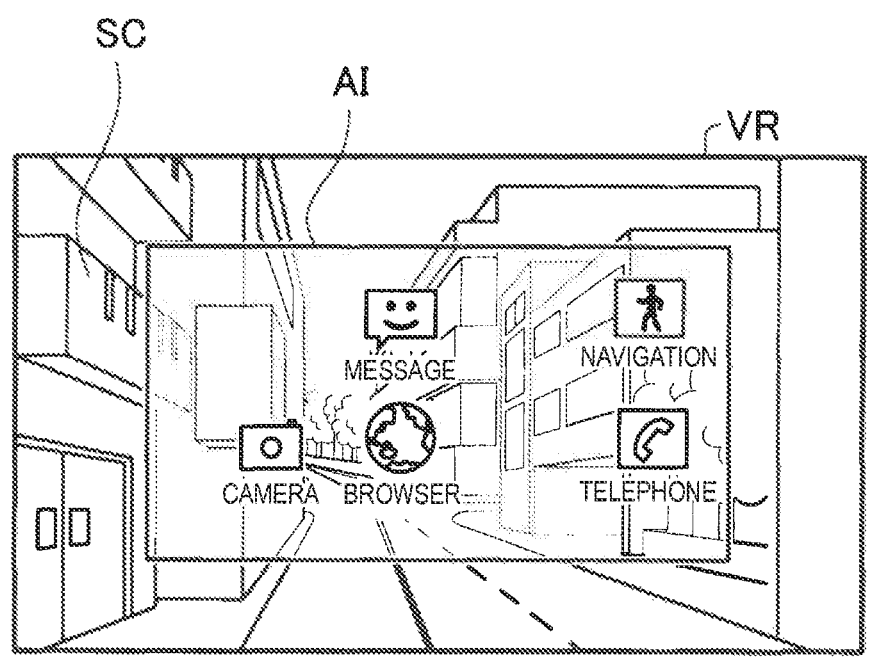
FIG. 7 is an explanatory diagram illustrating an example of augmented reality display by the HMD.

FIG. 7 is an explanatory diagram illustrating an example of augmented reality display by the HMD 100. FIG. 7 illustrates the field VR of view of the user. As described above, the image light guided to both eyes of the user of the HMD 100 forms an image on the retina of the user, and thus the user views the image AI as an augmented reality (AR). In the example of FIG. 7, the image AI is a menu screen of the OS of the HMD 100. The menu screen includes icons for activating each application program such as "message", "telephone", "camera", "browser", and "navigation." Since the right and left light guide plate 26 and 28 transmit light from the outside scene SC, the user views the outside scene SC. In this manner, the user of the HMD of this embodiment can view the image AI superimposed on the outside scene SC, for a portion in which an image AI is displayed in the field VR of view. Further, the user can view only the outside scene SC, for a portion in which the image AI is not displayed in the field VR of view.

A-5. With Respect to Route Guidance Process

Figure 8:
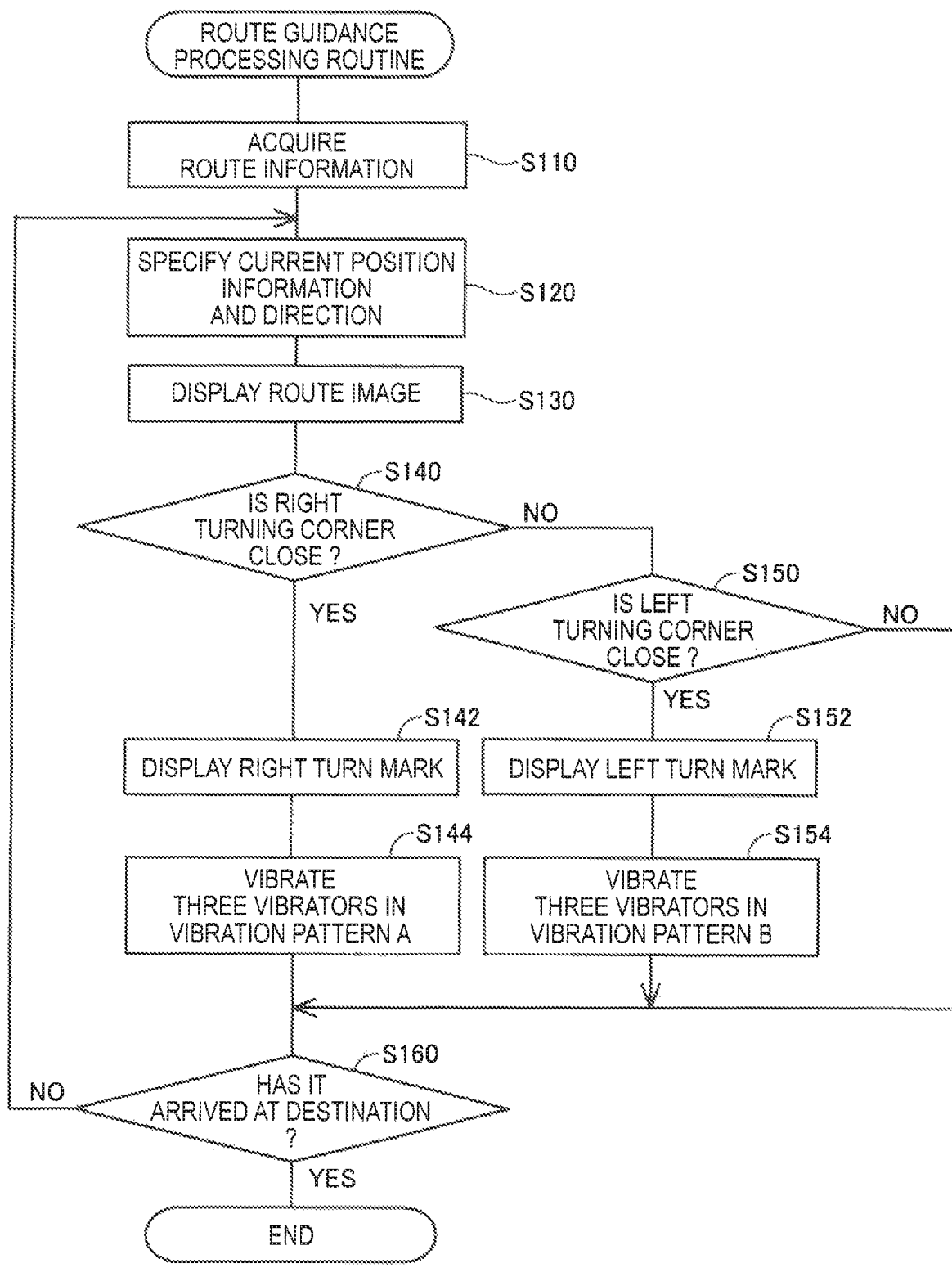
FIG. 8 is a flowchart illustrating a route guidance processing routine.

FIG. 8 is a flowchart illustrating a route guidance processing routine. The route guidance processing routine corresponds to the route guiding unit 155b (FIG. 6). The route guidance processing routine is a processing routine according to a predetermined computer program (application program) stored in the nonvolatile storage section 121 (FIG. 5), and is executed by the main processor 140 of the HMD 100. A navigation process is executed in response to the instruction to execute the "navigation" icon on the menu screen illustrated in FIG. 7 made by the direction key 16 (FIG. 1) and the decision key 17 (FIG. 1), and the route guidance processing routine is executed as a part of the navigation process. Specifically, the route guidance processing routine is executed in response to an instruction to start guidance for presenting the route searched by the navigation device 300 made by the direction key 16 and the decision key 17.

When the process is started, the main processor 140 of the HMD 100 first acquires the route information sent from the navigation device 300 (step S110). The route information is information indicating the route searched by the route search in the navigation device 300. That is, the route information is information including the traveling direction with reference to the position of the HMD 100. The information representing the route corresponds to "information including a direction with reference to the head mounted display" in an aspect of the invention described in the "Summary of Invention" section.

Next, the main processor 140 acquires detection signals of the six-axis sensor 235 and the magnetic sensor 237 provided in the image display unit 20, and specifies the current position and direction of the image display unit 20 from the detection signals (step S120).

Subsequently, the main processor 140 specifies a portion included in the field of view through the image display unit 20 of the user, among the routes indicated by the acquired route information, based on the route information acquired in step S110 and the current position and direction specified in step S120, and displays a route image indicating the specified part on the image display unit 20 (step S130).

Figure 9:
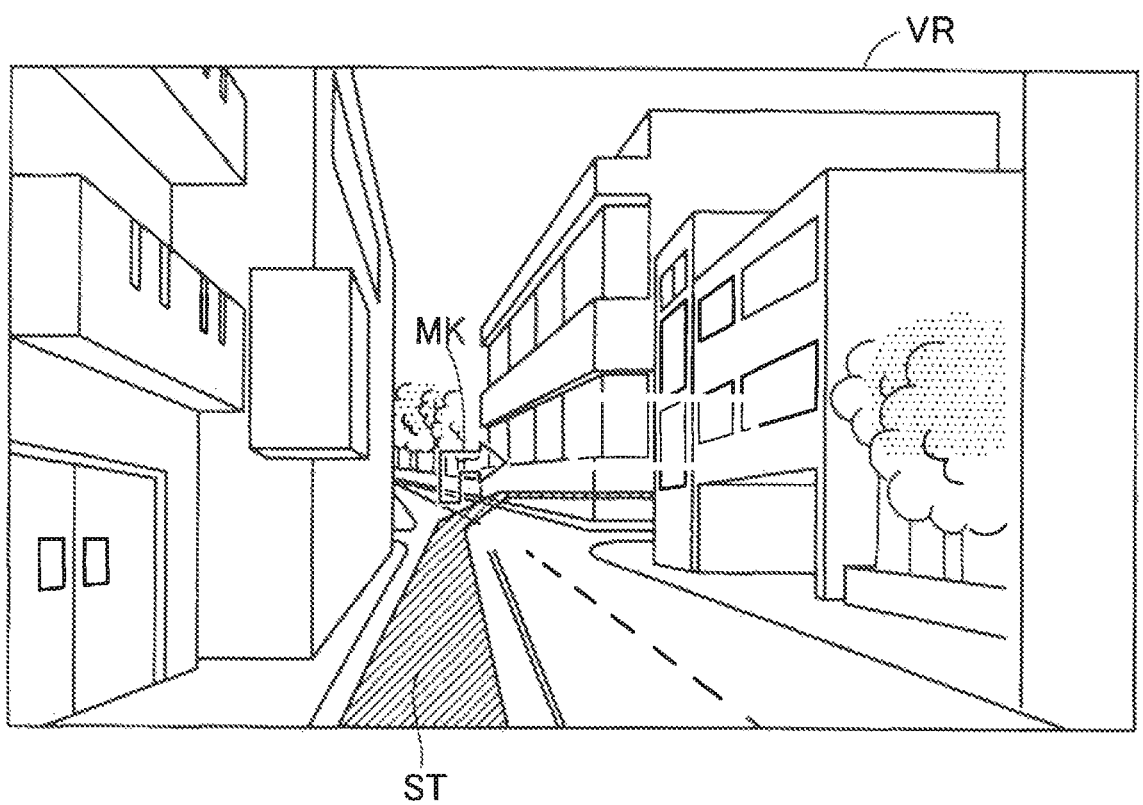
FIG. 9 is an explanatory diagram illustrating an example of a field of view visually recognized by the user.

FIG. 9 is an explanatory diagram illustrating an example of a field of view VR visually recognized by the user. As shown in FIG. 9, the user can see the outside scene SC which passed through the optical image display units 26 and 28 of the image display unit 20. Examples of the outside scene SC include scenery of the city. Then, as a result of step S130 in FIG. 8, the route image ST is displayed by being superimposed on the outer scene SC. The route image ST indicates the direction to the destination.

Subsequently, the main processor 140 determines whether or not the right turning corner is close to the current position, in the route indicated by the route image ST included in the field of view (step S140). Whether it is close or not is determined based on whether it is within a predetermined distance (for example, 5 m) or not. In a case where it is determined that the right turning corner is not close in step S140, the main processor 140 determines whether or not the left turning corner is close to the current position, in the route indicated by the route image ST included in the field of view (step S150).

In a case where it is determined that the left turning corner is not close in step S150, the main processor 140 advances the process to step S160 to determine whether or not it has arrived at the destination. Here, if it is determined that it has not arrived at the destination, the main processor 140 returns the process to step S120 and repeats step S120 and the subsequent processes. On the other hand, if it is determined in step S160 that it has arrived at the destination, the main processor 140 ends the route guidance routine.

In a case where it is determined that the right turning corner is close in step S140, the main processor 140 displays a right turn mark on the image display unit 20 (step S142). In FIG. 9, MK is a mark to turn right.

Thereafter, the main processor 140 performs a process of vibrating the three vibrators 71 to 73 provided in the image display unit 20 in a vibration pattern A, after performing delay for a predetermined time (for example, 30 ms) (step S144). The reason for delay for the predetermined time is to make the user feel the display in step S142 and the vibration in step S142 at the same time because the visual sense is delayed by about 30 ms with respect to the tactile sense.

FIG. 10 is an explanatory diagram illustrating a vibration pattern A and a vibration pattern B. As shown in FIG. 10, in the vibration pattern A, the following (a1) to (a6) are executed in this order and repeated until it turns right.

(a1) Vibrate the left-side vibrator 73 for a predetermined time (for example, 0.3 seconds).

(a2) An interval is set for a predetermined time (for example, 0.2 seconds).

(a3) Vibrate the front-side vibrator 71 for a predetermined time (for example, 0.3 seconds).

(a4) An interval is set for a predetermined time (for example, 0.2 seconds).

(a5) Vibrate the right-side vibrator 72 for a predetermined time (for example, 0.3 seconds).

(a6) An interval is set for a predetermined time (for example, 0.2 seconds).

According to the vibration pattern A, the left-side vibrator 73, the front-side vibrator 71, and the right-side vibrator 72 are repeatedly vibrated in this order. The user can feel vibration to flow from the left side of the head to the right side through the front side. That is, by the process from step S140 to step S144, while viewing the right turning corner, the user receives vibrations flowing from the left side to the right side through the front side, and can know that it is close to the right turning corner by visual and tactile sense. Vibration of the vibration pattern A ends when a predetermined period has elapsed. The predetermined period is a predetermined number of times of repetition or a period until the current position has entered the right turning corner. After execution of step S145, the main processor 140 advances the process to step S160.

In a case where it is determined that the left turning corner is close in step S150, the main processor 140 displays a left turn mark on the image display unit 20 (step S152).

Thereafter, the main processor 140 performs a process of vibrating the three vibrators 71 to 73 provided in the image display unit 20 in a vibration pattern B, after performing delay for a predetermined time (for example, 30 ms) (step S155). The reason for delay for the predetermined time is to make the user feel the display in step S142 and the vibration in step S142 at the same time.

As shown in FIG. 10, in the vibration pattern B, the following (b1) to (b6) are executed in this order and repeated until it turns right.

(b1) Vibrate the right-side vibrator 72 for a predetermined time (for example, 0.3 seconds).

(b2) An interval is set for a predetermined time (for example, 0.2 seconds).

(b3) Vibrate the front-side vibrator 71 for a predetermined time (for example, 0.3 seconds).

(b4) An interval is set for a predetermined time (for example, 0.2 seconds).

(b5) Vibrate the left-side vibrator 73 for a predetermined time (for example, 0.3 seconds).

(b6) An interval is set for a predetermined time (for example, 0.2 seconds).

According to the vibration pattern B, the right-side vibrator 72, the front-side vibrator 71, and the left-side vibrator 73 are repeatedly vibrated in this order. The user can feel vibration to flow from the right side of the head to the left side through the front side. That is, by the process from step S150 to step S154, while viewing the left turning corner, the user receives vibrations flowing from the right side to the left side through the front side, and can know that it is close to the left turning corner by visual and tactile sense. The predetermined period is a predetermined number of times of repetition or a period until the current position has entered the right turning corner. After execution of step S155, the main processor 140 advances the process to step S160.

A-6. Effect of Embodiment

According to the HMD 100 of the first embodiment configured as described above, the route image ST indicating the route searched by the navigation device 300 is displayed on the image display unit 20, and when the turning corner determined by the searched route is close, the front-side vibrator 71, the right-side vibrator 72, and the left-side vibrator 73 are vibrated in a vibration pattern corresponding to the turning direction. Therefore, the user can confirm the turning direction by the display on the image display unit 20 and the vibration of the vibrators 71 to 73. Therefore, according to the HMD 100, the notification performance to the user regarding the turning direction can be enhanced. Particularly, according to the HMD 100, since the vibration part shifts so as to flow in a turning direction, the notification performance regarding the direction can be further enhanced.

In the HMD 100 of the first embodiment, it is assumed that the left-side vibrator 73, the front-side vibrator 71, and the right-side vibrator 72 are repeatedly vibrated in this order in the vibration pattern A indicating that the right turning corner is close. On the other hand, as a modification example, the vibration pattern A may be configured such that only the right-side vibrator 72 vibrates (for example, it vibrates a plurality of times with an interval). In the HMD 100 of the first embodiment, it is assumed that the right-side vibrator 72, the front-side vibrator 71, and the left-side vibrator 73 are repeatedly vibrated in this order in the vibration pattern B indicating that the left turning corner is close. On the other hand, as a modification example, the vibration pattern B may be configured such that only the right-side vibrator 72 vibrates (for example, it vibrates a plurality of times with an interval).

B. Second Embodiment

Figure 11:
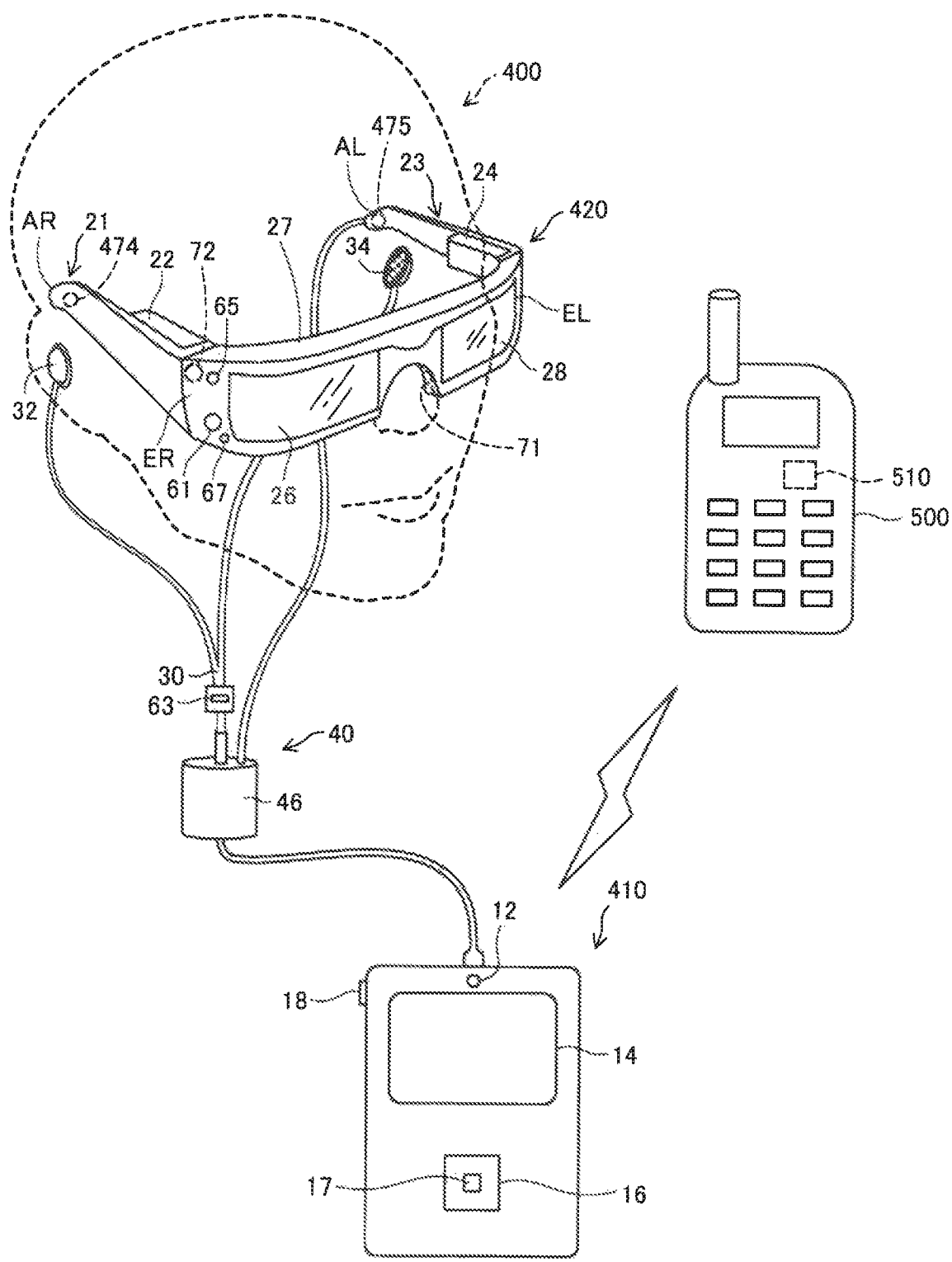
FIG. 11 is an explanatory diagram illustrating a schematic configuration of an information processing system of a second embodiment of the invention.

FIG. 11 is an explanatory diagram illustrating a schematic configuration of an information processing system of a second embodiment of the invention. The information processing system includes an HMD 400 and a portable wireless device 500. The portable wireless device 500 can perform wireless communication with the HMD 400. The portable wireless device 500 is used by a person different from the user of the HMD 400, for example, in a remote site far away from the HMD 400.

The portable wireless device 500 includes a GPS receiver 510. The GPS receiver 510 includes a GPS antenna (not shown), receives wireless signals transmitted from GPS satellites, and detects the coordinates (latitude and longitude) of the current position of the portable wireless device 500. The portable wireless device 500 is capable of transmitting the detected latitude and longitude to the HMD 400. Specifically, the portable wireless device 500 can transmit the coordinates of the current position to the HMD 400 by a specific simple operation, in addition to the talk mode in which the portable wireless device 500 makes a voice call with the HMD 400.

The HMD 400 in the second embodiment is different from the HMD 100 in the first embodiment in that the number of vibrators provided in the image display unit 420 and some functions realized by the control function unit 450 (FIG. 13) of the control device 410 are different. The remaining components of the HMD 400 of the present embodiment are the same as those of the HMD 100 of the first embodiment, and the same reference numerals as those of the first embodiment are attached, and a description thereof will be omitted.

Figure 12:
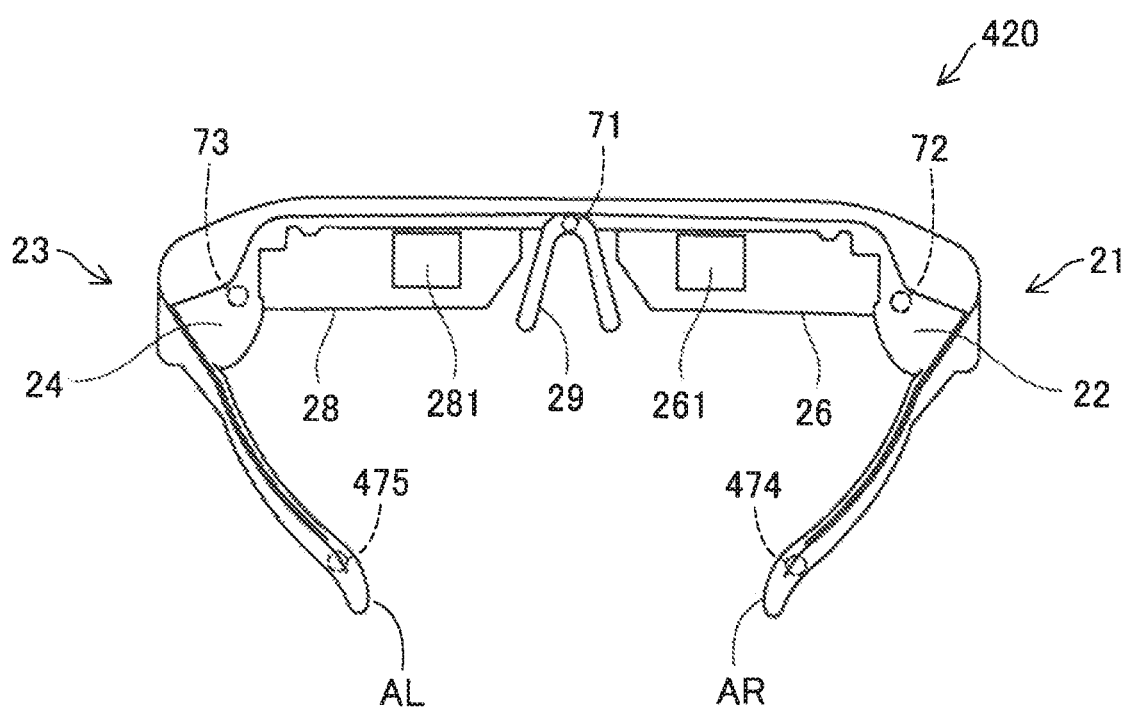
FIG. 12 is a diagram illustrating a configuration of main parts of the image display unit viewed from the user.

FIG. 12 is a diagram illustrating a configuration of main parts of the image display unit 420 viewed from the user. FIG. 12 is a diagram corresponding to FIG. 3 in the first embodiment. Five vibrators are provided in the image display unit 420 of the HMD 400. Three of the five vibrators are the same as the vibrators 71 to 73 in the first embodiment, and are provided at the same position as in the first embodiment. That is, the image display unit 420 is provided with a front-side vibrator 71, a right-side vibrator 72, and a left-side vibrator 73. Further, a vibrator 474 (hereinafter referred to as "right rear-side vibrator 474") is provided in the vicinity of the tip AR of the right holding unit 21 (a temple portion on the right side in a case of eyeglasses), and a vibrator 475 (hereinafter referred to as "left rear-side vibrator 475") is provided in the vicinity of the tip AL of the left holding unit 23 (a temple portion of the left side in a case of eyeglasses).

Figure 13:
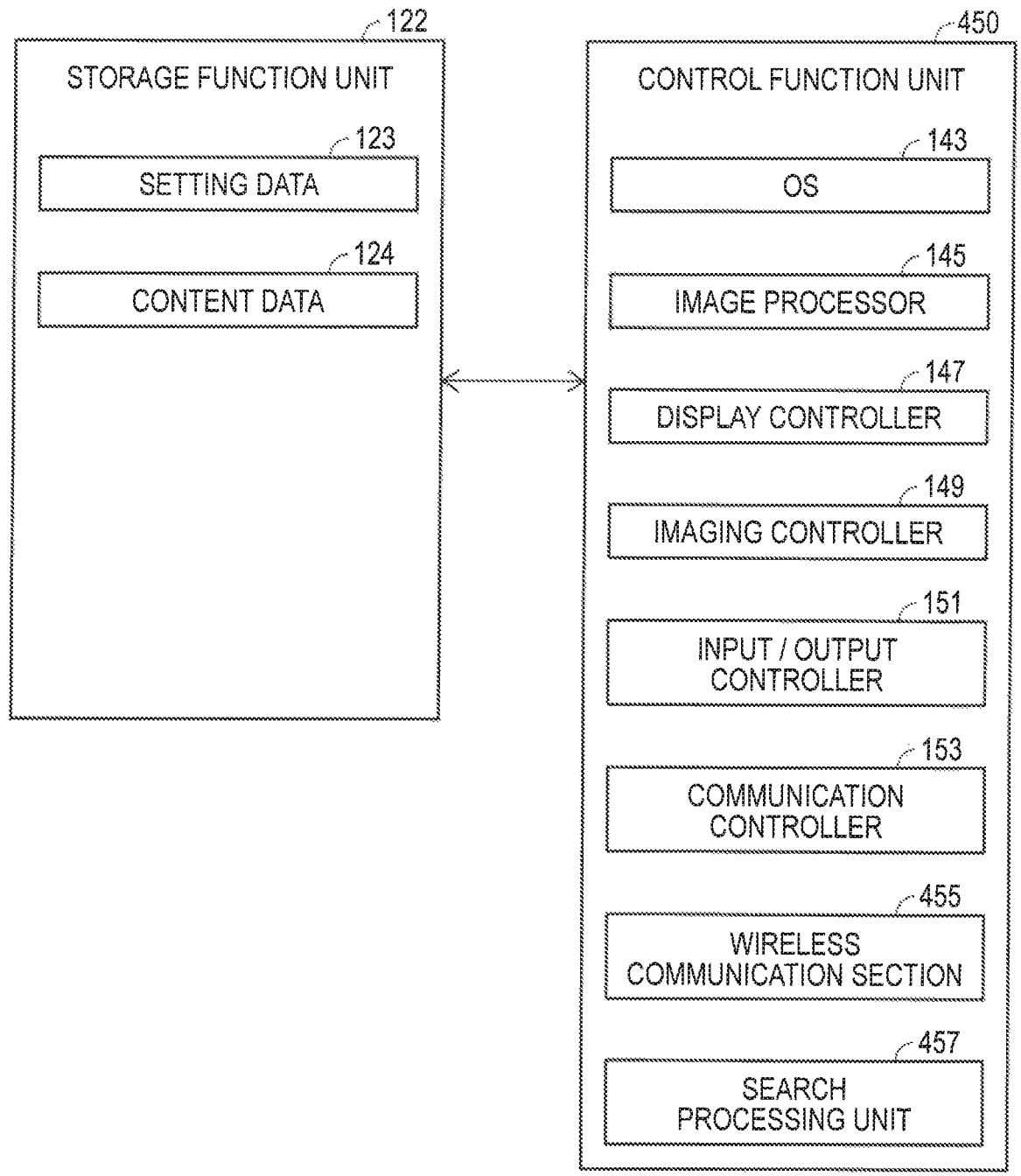
FIG. 13 is a block diagram functionally illustrating a configuration of a control device.

FIG. 13 is a block diagram functionally illustrating the configuration of the control device 410. The control function unit 450 of the control device 410 is different from the control function unit 150 (FIG. 6) in the first embodiment in including a wireless communication section 455, and a search processing unit 457, instead of the navigation processor 155. The wireless communication section 455 performs a voice call. The search processing unit 457 searches for the user (hereinafter referred to as "communicator") of the portable wireless device 500.

Figure 14:
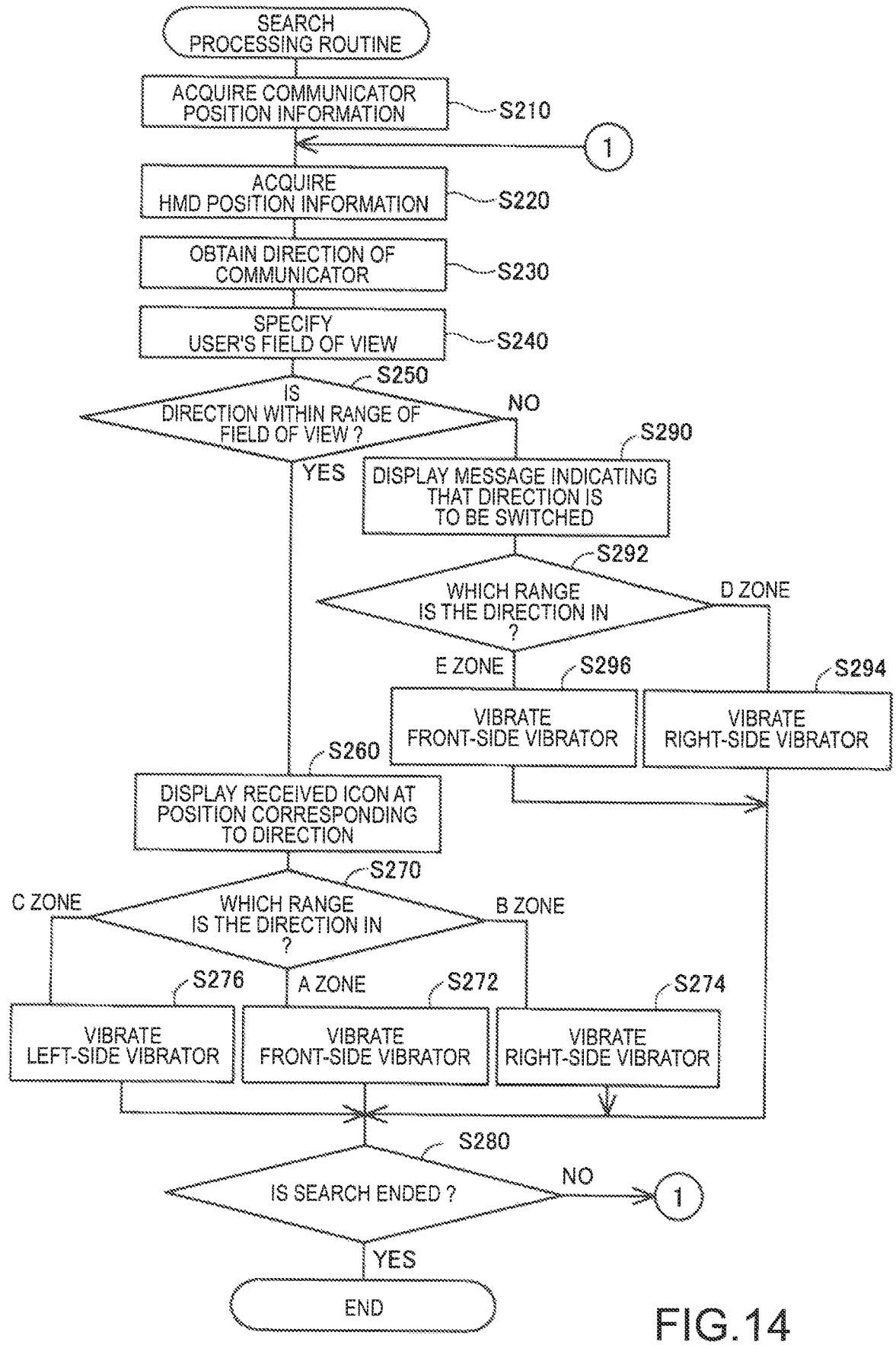
FIG. 14 is a flowchart illustrating a search processing routine.

FIG. 14 is a flowchart illustrating a search processing routine. The search processing routine corresponds to the search processing unit 457 (FIG. 13). The search processing routine is a processing routine according to a predetermined computer program (application program) stored in the nonvolatile storage section, and is executed by the main processor 140 of the HMD 400. Specifically, the search processing routine is executed in response to an instruction to start the search of the communicator made by the direction key 16 and the decision key 17.

When the process is started, the main processor 140 of the HMD 400 first acquires the communicator position information indicating the coordinates of the current position of the portable wireless device 500, sent from the portable wireless device 500 (step S210). Next, the main processor 140 acquires position information (hereinafter referred to as "HMD position information") indicating the coordinates (latitude and longitude) of the current position of the HMD 100 from the GPS receiver 115 (step S220).

Next, the main processor 140 obtains the direction where the communicator is located, based on the position of the HMD 400, based on the acquired communicator position information and HMD position information (step S230). The direction corresponds to "information including a direction based on the head mounted display" in an aspect of the invention described in the "Summary of Invention" section.

Subsequently, the main processor 140 acquires detection signals of the six-axis sensor 235 and the magnetic sensor 237 provided in the image display unit 20, and specifies the direction of the image display unit 20, that is, the user's field of view, from the detection signals (step S240).

After execution of step S240, the main processor 140 determines whether or not the direction of the communicator with respect to the HMD obtained in step S230 is within the range of the field of view specified in step S240 (step S250). Here, in a case where it is determined that the direction of the communicator is within the range of the field of view, a process of displaying the received icon at the screen position corresponding to the direction is performed (step S260).

Figure 15:
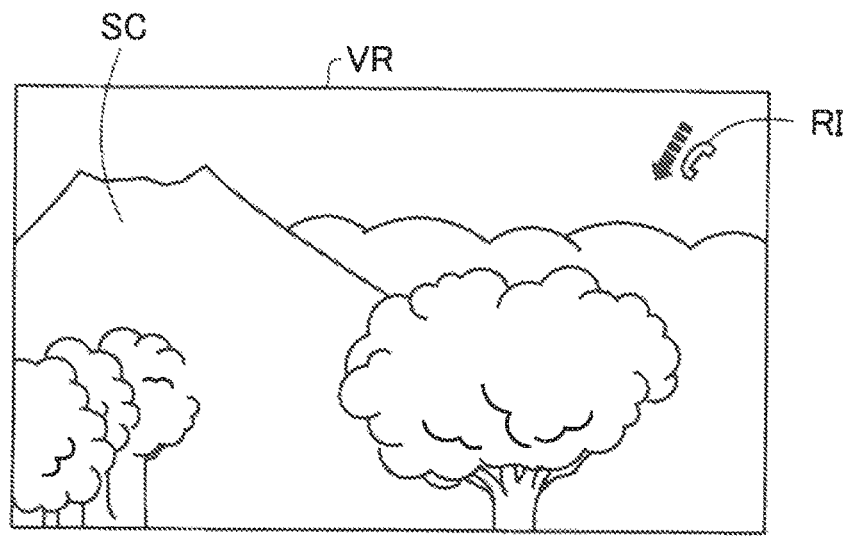
FIG. 15 is an explanatory diagram illustrating an example of a field of view visually recognized by the user.

FIG. 15 is an explanatory diagram illustrating an example of a field of view VR visually recognized by the user. As shown in FIG. 15, the user can see the outside scene SC which passed through the optical image display units 26 and 28 of the image display unit 20. Examples of the outside scene SC include scenery of mountain. Then, as a result of step S260, the received icon RI is displayed by being superimposed on the outer scene SC. The display position of the received icon RI is a position indicating the direction where the communicator is located.

Returning to FIG. 14, after the execution of step S260, the main processor 140 determines which range of the A zone, the B zone, and the C zone predetermined inside the range of field of view specified in step S240, the direction of the communicator with respect to the HMD obtained in step S230 is included in (step S270).

Figure 16:
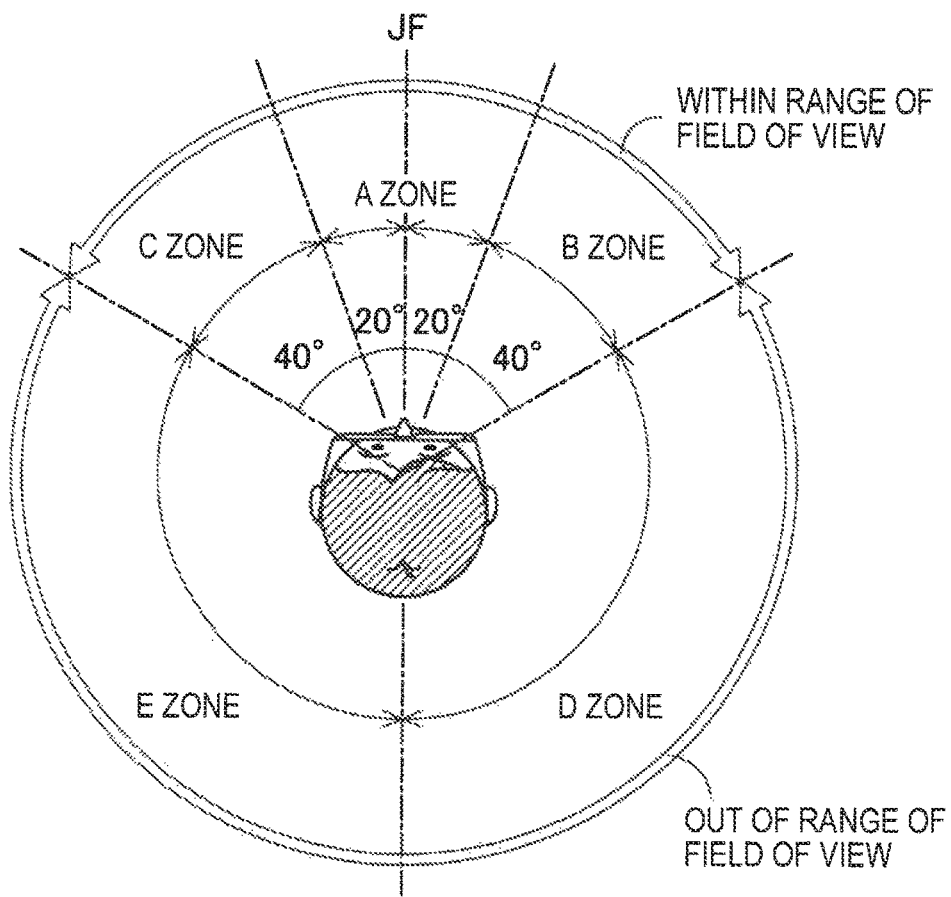
FIG. 16 is an explanatory diagram illustrating an A zone, a B zone, and a C zone.

FIG. 16 is an explanatory diagram illustrating an A zone, a B zone, and a C zone. As shown in FIG. 16, the A zone, the B zone and the C zone are predetermined within the range of the field of view visible through the image display unit 20 in the horizontal plane. Each of the A zone, the B zone, and the C zone is an angular range of the same size, for example, a size of 40 degrees. An example of 40 degrees is a simple numerical value fitted for easy understanding, and in reality, it is one third of the range of the field of view visible through the image display unit 20. The A zone is a range on the front side centered on the direct front surface JF, the B zone is in the range on the right front side, and the C zone is in the range on the left front side.

In a case where it is determined that the direction of the communicator is included in the A zone in step S270 of FIG. 14, a process of vibrating the front-side vibrator 71 for a predetermined time (for example, 0.3 seconds) and setting an interval of a predetermined time (for example, 0.2 seconds) is repeatedly executed a plurality of times (for example, three to five times) (step S272). The number of repetitions need not be limited to three to five times, and may be any number of times, such as twice, six or more times. Further, it may be only once.

In a case where it is determined that the direction of the communicator is included in the B zone in step S270, a process of vibrating the right-side vibrator 72 for a predetermined time (for example, 0.3 seconds) and setting an interval of a predetermined time (for example, 0.2 seconds) is repeatedly executed a plurality of times (for example, three to five times) (step S274). The number of repetitions need not be limited to three to five times, and may be any number of times, such as twice, six or more times. Further, it may be only once.

In a case where it is determined that the direction of the communicator is included in the C zone in step S270, a process of vibrating the left-side vibrator 73 for a predetermined time (for example, 0.3 seconds) and setting an interval of a predetermined time (for example, 0.2 seconds) is repeatedly executed a plurality of times (for example, three to five times) (step S276). The number of repetitions need not be limited to three to five times, and may be any number of times, such as twice, six or more times. Further, it may be only once.

The process of each of step S272, step S274, and step S276 may be executed after a delay of a predetermined time (for example, 30 ms) after execution of display in step S260. The reason for delay for the predetermined time is to make the user feel the display in step S142 and the vibration in step S142 at the same time because the visual sense is delayed by about 30 ms with respect to the tactile sense.

After execution of step S272, after execution of step S274, or after execution of step S276, it is determined whether to end the search (step S280). Specifically, the above determination is performed, based on whether or not the end of the search of the communicator is instructed by the direction key 16 or the decision key 17. Here, in a case where it is determined that the search is not ended, the process returns to step S220, and step S220 and the subsequent processes are repeatedly executed.

In a case where it is determined in step S250 that the direction of the communicator is out of the range of the field of view, a message indicating that the direction of the image display unit 20, that is, the direction of the user is to be switched to the other direction is displayed on the image display unit 20 (step S290). Subsequently, it is determined which range of the D zone and the E zone predetermined outside the range of field of view, the direction of the communicator is included in (step S292).

As shown in FIG. 16, a D zone and an E zone are predetermined outside the range of the field of view on the horizontal plane (out of the field of view). The D zone is on the right rear side of the user, and the E zone is on the left rear side of the user. Each of the D zone and the E zone is an angular range of the same size, for example, a size of 120 degrees. An example of 120 degrees is a simple numerical value fitted for easy understanding.

In a case where it is determined that the direction of the communicator is included in the D zone in step S292, a process of vibrating the right rear-side vibrator 474 for a predetermined time (for example, 0.3 seconds) and setting an interval of a predetermined time (for example, 0.2 seconds) is repeatedly executed a plurality of times (for example, three to five times) (step S294). The number of repetitions need not be limited to three to five times, and may be any number of times, such as twice, six or more times. Further, it may be only once.

In a case where it is determined that the direction of the communicator is included in the E zone in step S292, a process of vibrating the left rear-side vibrator 475 for a predetermined time (for example, 0.3 seconds) and setting an interval of a predetermined time (for example, 0.2 seconds) is repeatedly executed a plurality of times (for example, three to five times) (step S296). The number of repetitions need not be limited to three to five times, and may be any number of times, such as twice, six or more times. Further, it may be only once. After execution of step S294, or after execution of step S296, the process proceeds to the process of step S280.

According to the HMD 400 of the second embodiment configured as described above, the received icon RI indicating the direction in which the communicator performing communication with the portable wireless device 500 is located is displayed on the image display unit 20, and the vibrators 71, 72, 73, 474, and 475 disposed at the positions corresponding to the direction are vibrated. Therefore, the user can confirm the direction in which the communicator is located by the display on the image display unit 20 and the vibration of the vibrators 71, 72, 73, 474, and 475. Therefore, according to the HMD 100, the notification performance to the user regarding the direction in which the communicator is located can be enhanced.

C. Third Embodiment

The HMD in the third embodiment of the invention differs from the HMD 100 in the first embodiment in some functions realized by the control function unit of the control device. In the first embodiment, the control function unit 150 (FIG. 6) includes a navigation processor 155. On the other hand, in the third embodiment, instead of the navigation processor 155, an input auxiliary unit (not shown) is provided. The remaining components of the HMD of the third embodiment are the same as in the first embodiment, and the same reference numerals as those of the first embodiment are attached, and a description thereof will be omitted.

Figure 17:
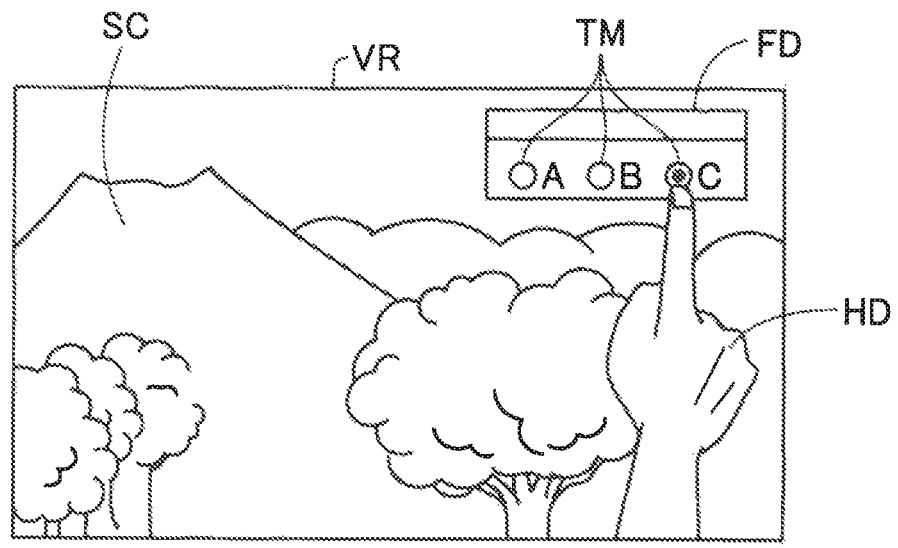
FIG. 17 is an explanatory diagram illustrating an example of a field of view visually recognized by the user.

FIG. 17 is an explanatory diagram illustrating an example of a field of view VR visually recognized by the user. As shown in FIG. 17, the user can see the outside scene SC which passed through the optical image display units 26 and 28 of the image display unit 20. Then, an input field FD which is an input screen is displayed by being superimposed on the outside scene SC.

In the input field FD, three input items TM for accepting input operations by the user are provided. In the present embodiment, the input items TM are radio buttons. The input items TM of "A", "B", and "C" are arranged in the horizontal direction from the left side to the right side in this order. As described above, since the outside scene is transparent and visible, the user extends the fingertip of the hand HD into the field of view so as to be able to tap the input item TM with the fingertip. In FIG. 17, the case where the input item TM of "C" is selected is shown.

In the present embodiment, the input item TM of "A" positioned on the left side is previously associated with the left-side vibrator 73, the input item TM of "B" positioned in the center is previously associated with the front-side vibrator 71, and the input item TM of "C" positioned on the right side is previously associated with the right-side vibrator 72. When the input item TM of "A" is tapped, the input auxiliary unit vibrates the left-side vibrator 73 (for example, it is vibrated a plurality of times with an interval). When the input item TM of "B" is tapped, the input auxiliary unit vibrates the front-side vibrator 71 (for example, it is vibrated a plurality of times with an interval). When the input item TM of "C" is tapped, the input auxiliary unit vibrates the right-side vibrator 72 (for example, it is vibrated a plurality of times with an interval).

According to the HMD of the third embodiment configured as described above, it is possible to notify which one of the plurality of input items arranged on the input screen the input operation is performed to, by using the plurality of vibrators. Therefore, the user can confirm which one of the plurality of input items the input operation is performed to, by vibrations. In particular, since the operation of the input field FD on the screen displayed by the image display unit 20 does not make the user feel the tactile sense at the fingertip, it is not realistic for the user. On the other hand, in the present embodiment, the user can obtain the tactile sense by vibrations. Therefore, according to the HMD, the notification performance to the user regarding the input operation can be enhanced.

In the HMD of the third embodiment, the input item TM is a radio button. On the other hand, as the modification example, the input item TM may be other types such as a check box, a text box, or a pull-down type selection menu. In addition, although the number of input items TM may not necessarily be the same as the number of vibrators, for example, six input items may be divided into three groups, and the groups may be associated with three vibrators.

D. Fourth Embodiment

The HMD in the fourth embodiment of the invention differs from the HMD 100 in the first embodiment in some functions realized by the control function unit of the control device. In the first embodiment, the control function unit 150 (FIG. 6) includes a navigation processor 155. On the other hand, in the fourth embodiment, instead of the navigation processor 155, an e-book reading unit (not shown) is provided. The remaining components of the HMD of the fourth embodiment are the same as in the first embodiment, and the same reference numerals as those of the first embodiment are attached, and a description thereof will be omitted.

Figure 18:
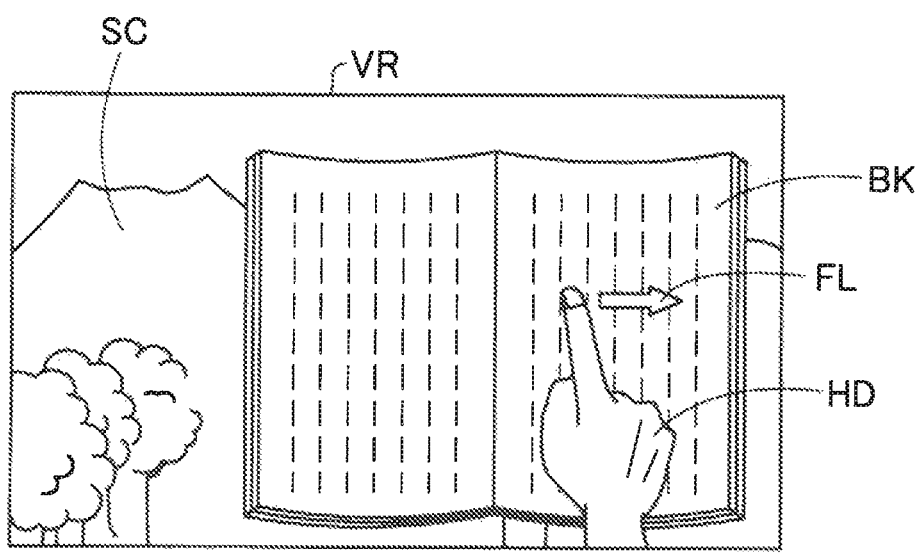
FIG. 18 is an explanatory diagram illustrating an example of a field of view visually recognized by the user.

FIG. 18 is an explanatory diagram illustrating an example of a field of view VR visually recognized by the user. As shown in FIG. 17, the user can see the outside scene SC which passed through the optical image display units 26 and 28 of the image display unit 20. Then, an electronic book BK is displayed by being superimposed on the outside scene SC. The function of displaying the electronic book BK corresponds to an e-book reading unit.

Since the outside scene is transparent and visible as described above, the user can turn the page, by extending the fingertip (operation element) of the hand HD into the field of view, placing the fingertip on the surface of the page of the e-book BK (superimposing), and flicking (moving) as shown by the arrow FL. When detecting that the operation of flicking the fingertip to the right is performed, the e-book reading unit vibrates the right-side vibrator 72 (for example, it is vibrated a plurality of times with an interval). When detecting that the operation of flicking the fingertip to the left is performed, the e-book reading unit vibrates the left-side vibrator 73 (for example, it is vibrated a plurality of times with an interval).

According to the HMD of the fourth embodiment configured as described above, it is possible to notify that an operation of flicking to the right side and an operation of flicking to the left side are made, by the plurality of vibrators. Therefore, according to the HMD, the notification performance to the user regarding the input operation can be enhanced.

In the fourth embodiment, the operation element in the input operation by the user is the fingertip, but instead thereof, it may be the palm of the hand. This allows the user to turn pages by hand turning. The HMD of the fourth embodiment includes a front-side vibrator 71, a right-side vibrator 72, and a left-side vibrator 73, similar to the HMD of the first embodiment. On the other hand, as a modification example, the front-side vibrator 71 may not be provided. This is because the e-book reading unit does not use the front-side vibrator 71.

E. Modification Example

The invention is not limited to the first to fourth embodiments or modification examples thereof, but can be implemented in various modes without departing from the gist thereof, and for example, the following modifications are possible.

Modification Example 1

Figure 19:
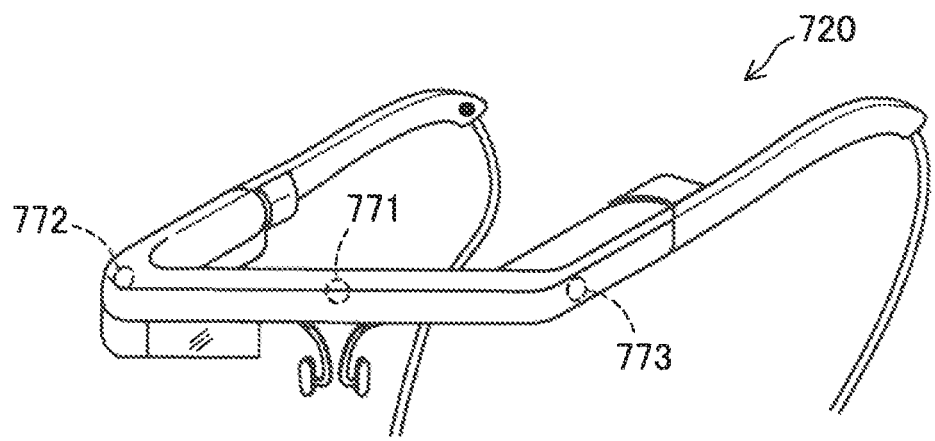
FIG. 19 is an explanatory diagram illustrating an image display unit included in a head mounted image display as Modification Example 1.

FIG. 19 is an explanatory diagram illustrating an image display unit 720 included in a head mounted image display (HMD) as Modification Example 1. In each embodiment and the modification example thereof, it is assumed that the HMD is a binocular transmissive head mounted display. On the other hand, as Modification Example 1, as shown in FIG. 19, a monocular head-mounted display may be used. In the illustrated example, a front-side vibrator 771, a right-side vibrator 772, and a left-side vibrator 773 are provided in the image display unit 720, similar to the HMD of the first embodiment.

Modification Example 2

Figure 20:
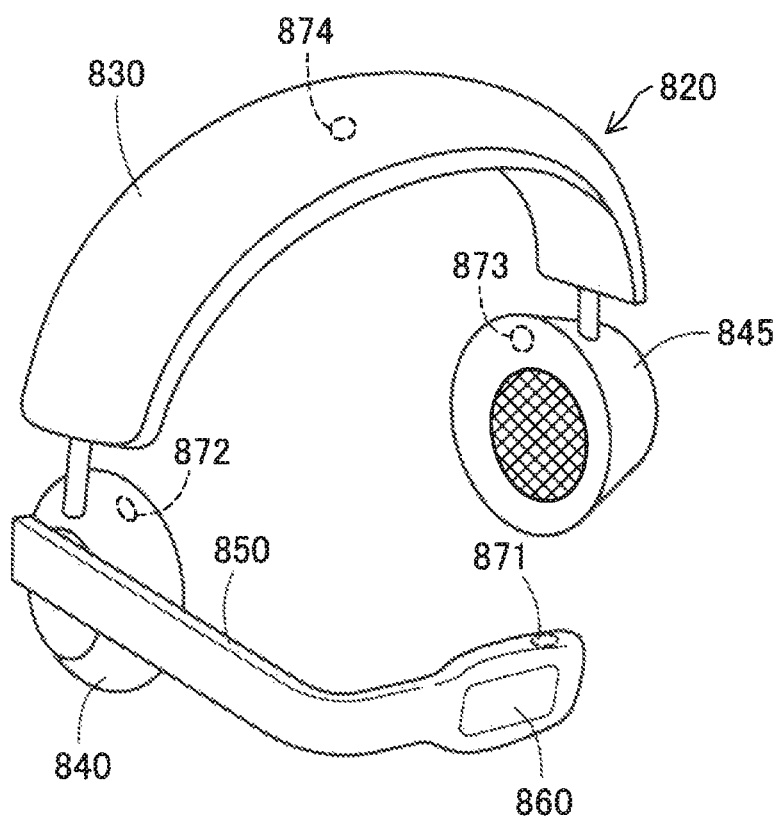
FIG. 20 is an explanatory diagram illustrating an image display unit included in a head mounted image display as Modification Example 2.

FIG. 20 is an explanatory diagram illustrating an image display unit included in a head mounted image display as Modification Example 2. An image display unit 820 includes a headband 830 attached to the head of a user (not shown), left and right headphones 840 and 845 respectively attached to both end sides of the headband 830, a display arm 850 supported by one of the left and right headphones 840 and 845 (in the illustrated example, the right headphone 840), and a display (display unit) 860 attached to the display arm 850 and disposed in front of the user's eyes.

A front-side vibrator 871 is provided on the upper part of the front end side of the display arm 850. A right-side vibrator 872 is provided on the right headphone 840. A left-side vibrator 873 is provided on the left headphone 845. An upper vibrator 874 is provided in the center of the headband 830. In the head mounted image display of this configuration, when the information including the upward direction is input, the upper vibrator 874 is vibrated. Therefore, compared to the first embodiment, Modification Example 2 can notify more complicated information by vibration. The HMDs of the first, third, and fourth embodiments include three vibrators, the HMD of the second embodiment includes five vibrators, and the HMD of Modification Example 2 includes four vibrators, but as a modification example, a plurality of vibrators other than the above numbers may be provided. In a case where a large number of vibrators are provided, the distance between vibrators is longer than the two-point discrimination threshold. The two-point discrimination threshold is the smallest distance that can be distinguished as being caused by different stimuli regardless of vision when a mechanical stimulus is given to two points on the body surface. In addition, the mounting position of each vibrator may be a portion directly contacting the skin of the user, or may be a portion that does not directly contact but transmits vibration.

Modification Example 3

Figure 21:
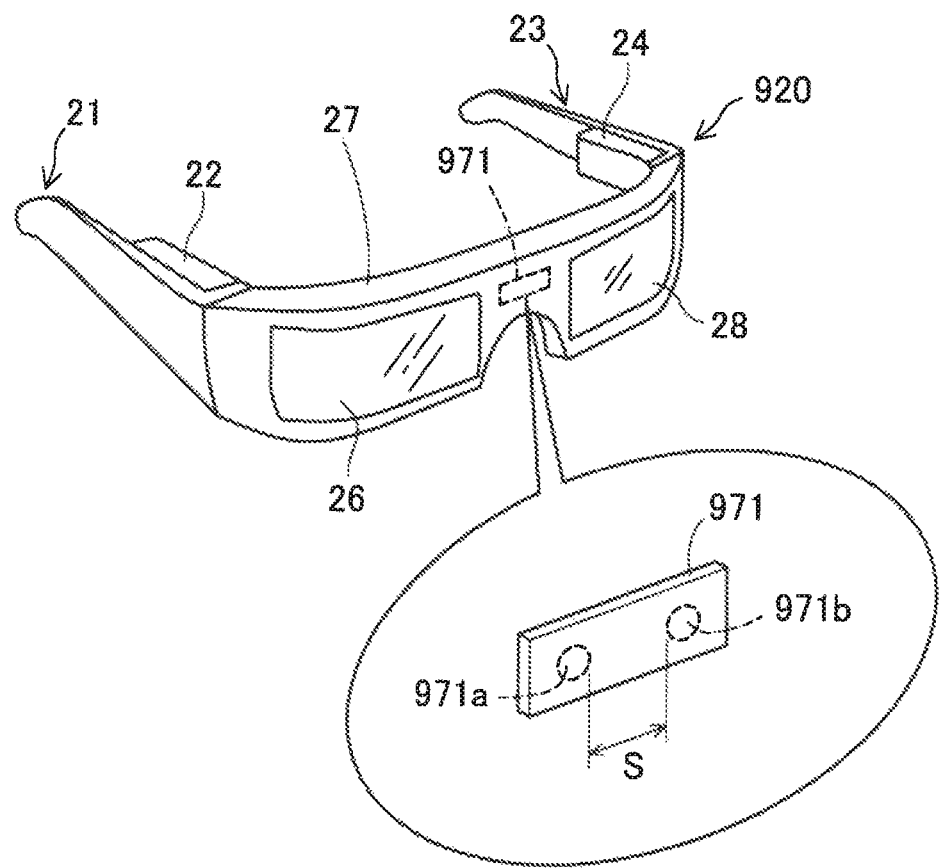
FIG. 21 is an explanatory diagram illustrating an image display unit included in a head mounted image display as Modification Example 3.

FIG. 21 is an explanatory diagram illustrating an image display unit included in a head mounted image display as Modification Example 3. The image display unit 920 differs from the image display unit 20 in the first embodiment in that the image display unit 920 does not include a right-side vibrator or a left-side vibrator and that it includes a vibrator unit 971 instead of the front-side vibrator. The remaining components of the HMD of Modification Example 3 are the same as those of the HMD 100 of the first embodiment, and the same reference numerals as those of the first embodiment are attached, and a description thereof will be omitted.

The vibrator unit 971 includes two vibrators (vibrators) 971a and 971b. The two vibrators (vibrators) 971a and 971b are disposed apart from each other by a predetermined distance S along the longitudinal direction of the vibrator unit 971. In Modification Example 3, the vibrator unit 971 is disposed in the center portion of the front frame 27 in the image display unit 20 such that the longitudinal direction is the left-right direction. The distance S is equal to or longer than the two-point discrimination threshold. Since the two-point discrimination threshold is less than 2 cm in the forehead part, in Modification Example 3, the distance S is set to 2 cm.

In Modification Example 3, the vibration pattern A to be executed in a case where it is determined that it is close to the right turning corner is as follows. Execute the following (c1) to (c4) in this order and repeat until it turns right.

(c1) Vibrate the left-side vibrator 971b for a predetermined time (for example, 0.3 seconds).

(c2) An interval is set for a predetermined time (for example, 0.2 seconds).

(c3) Vibrate the right-side vibrator 971b for a predetermined time (for example, 0.3 seconds).

(c4) An interval is set for a predetermined time (for example, 0.2 seconds).

The vibration pattern B to be executed in a case where it is determined that it is close to the left turning corner is as follows. Execute the following (d1) to (d4) in this order and repeat until it turns left.

(d1) Vibrate the right-side vibrator 971b for a predetermined time (for example, 0.3 seconds).

(d2) An interval is set for a predetermined time (for example, 0.2 seconds).

(d3) Vibrate the left-side vibrator 971b for a predetermined time (for example, 0.3 seconds).

(d4) An interval is set for a predetermined time (for example, 0.2 seconds).

According to Modification Example 3 configured as described above, when the turning corner determined on the route searched by the navigation device is close, the user receives the vibration flowing from the right side to the left side (or from the left side to the right side) according to the turning direction. Therefore, according to Modification Example 3, similar to the first embodiment, the notification performance regarding the turning direction can be enhanced. In this modification example, two vibrators are provided in one unit, but instead thereof, three or more vibrators may be provided.

Modification Example 4

In each embodiment and modification example, the vibration pattern for vibrating a plurality of vibrators is a combination of the constant vibration intensity of each vibrator and the time to vibrate each vibrator. On the other hand, as a modification example, the vibration intensity of each vibrator may be individually changed. In addition, the vibration intensity of each vibrator may have a default (initial value) and may have a configuration in which the vibration intensity of each vibrator can be customized by the user. Since the head mounted display has individual differences in feeling of wearing when it is worn, the preference of vibration intensity differs among individuals. By adopting a configuration in which the vibration intensity of each vibrator can be customized, it is possible to cope with the preference of the vibration intensity of an individual.

Modification Example 5

In the third and fourth embodiments, it is assumed that the user performs the input operation by extending the fingertip of hand HD into the field of view, and moving the fingertip. On the other hand, as a modification example, an input operation may be performed from a wearable device. The wearable device may be other types such as a watch type, a pen type, a ring type, or clothing. In addition, as a modification example of the fifth embodiment, instead of the wearable device, a PDA, a mobile phone, or a smart phone may be used.

Modification Example 6

In the third embodiment, it is configured such that it is possible to notify which item of the radio buttons that the input operation is made, by the plurality of vibrators. On the other hand, as a modification example, it may have a configuration in which it is possible to notify which one of the ON and OFF operations has been performed on the push button which is the GUI, by a plurality of vibrators. Specifically, when the push button is switched from OFF to ON, the right-side vibrator vibrates, and when the push button is switched from ON to OFF, the left-side vibrator is vibrated. According to this configuration, the notification performance to the user regarding the input operation to the push button can be enhanced. Furthermore, it is not necessary to be limited to the radio buttons or push buttons, and it may be configured to notify that an input operation has been made to another type of GUI such as a toggle button, by using a plurality of vibrators.

Modification Example 7

In the first embodiment, the direction in which the user wearing the HMD turns is notified by the vibration patterns of the plurality of vibrators. In the second embodiment, the direction of the wireless communication device performing radio communication with the HMD is notified by the vibration patterns of the plurality of vibrators. On the contrary, as a modification example, in addition to the camera 61 that captures an image of the front of the HMD, a camera that captures an image of the left direction of the HMD, a camera that captures an image of the right direction of the HMD, and a camera that captures an image of the rear of the HMD may be installed in an HMD, and when the danger of a collision of a car, a bicycle, or the like is detected to the user wearing the HMD from the cameras, the direction in which the danger is imminent to the user may be notified by the vibration patterns of the plurality of vibrators. Specifically, when the danger of collision is imminent from the right direction, the right-side vibrator is vibrated, and when the danger of collision is imminent from the left direction, the left-side vibrator is vibrated. For example, the camera that captures an image of the rear of the HMD may be mounted facing the rear of the HMD, in the tip AL of the left holding unit 23 (the tip of the temple portion on the left side in a case of eyeglasses) or the tip AR of the right holding unit 21 (the tip of the temple portion on the right side in a case of eyeglasses). According to the modification example, it is possible to notify the user wearing the HMD that the danger of collision is imminent by vibrations.

Modification Example 8

In the first embodiment, the second embodiment, and Modification Example 7, various notifications are made by vibrations of a plurality of vibrators. On the other hand, as a modification example, a configuration may be adopted in which the notifications are made by voice as well as vibrations of a plurality of vibrators.

Modification Example 9

In each of embodiments and modification examples, a part of the configuration realized by hardware may be replaced with software, or on the contrary, a part of the configuration realized by software may be replaced with hardware.

Modification Example 10

In the above embodiment, the configuration of the HMD is exemplified. However, the configuration of the HMD can be arbitrarily determined without departing from the gist of the invention, and for example, addition, deletion, conversion, or the like of the constituent elements can be made.

In the above embodiment, the so-called transmission type HMD 100 in which the right light guide plate 26 and the left light guide plate 28 transmit outside light has been described. However, the invention can also be applied to, for example, a so-called non-transmissive HMD 100 in which an image is displayed without transmitting the outside scene. Further, an outside scene may be captured with a camera and the captured image may be displayed on the display unit, in the non-transmissive HMD 100. In these HMDs 100, in addition to augmented reality (AR) display for displaying images superimposed on the real space described in the above embodiment, mixed reality (MR) display in which the captured image of a real space and a virtual images are displayed in combination with each other, or virtual reality (VR) display for displaying a virtual space can be performed.

In the above embodiments, the functional units of the control device 10 and image display unit 20 are described, but they can be arbitrarily changed. For example, the following aspects may be adopted. An aspect in which the control device 10 is equipped with the storage function unit 122 and the control function unit 150, and the image display unit 20 is equipped with only a display function. An aspect in which the storage function unit 122 and the control function unit 150 are mounted on both the control device 10 and the image display unit 20. An aspect in which the control device 10 and the image display unit 20 are integrated. In this case, for example, the image display unit 20 includes all the components of the control device 10 and is configured as a glasses-type wearable computer. An aspect in which a smart phone or a portable game device is used instead of the control device 10. An aspect in which the control device 10 and the image display unit 20 are connected by wireless communication and the connection cable 40 is disposed. In this case, for example, power supply to the control device 10 and the image display unit 20 may also be performed wirelessly.

Modification Example 11

In the above embodiments, the configuration of the control device is illustrated. However, the configuration of the control device can be arbitrarily determined without departing from the gist of the invention, and for example, addition, deletion, conversion, or the like of the constituent elements can be made.

In the above embodiments, an example of the input units included in the control device 10 is described. However, the control device 10 may be configured by omitting some input units exemplified, and includes other input units which are not described above. For example, the control device 10 may be equipped with an operation stick, a keyboard, a mouse, or the like. For example, the control device 10 may be equipped with an input unit that interprets a command associated with the movement of a user's body, or the like. For example, the movement of a user's body or the like can be obtained by line-of-sight detection for detecting a line of sight, gesture detection for detecting a movement of a hand, a foot switch for detecting a foot movement, or the like. The line-of-sight detection can be realized by a camera that takes an image of the inside of the image display unit 20. The gesture detection can be realized, for example, by analyzing the images captured by the camera 61 chronologically.

In the above embodiments, the control function unit 150 is configured to operate by the main processor 140 executing the computer program in the storage function unit 122. However, the control function unit 150 can employ various configurations. For example, the computer program may be stored in the nonvolatile storage section 121, the EEPROM 215, the memory 118, and other external storage devices (including a storage device such as a USB memory inserted in each of various interfaces, and an external device such as a server connected through a network), instead of the storage function unit 122, or together with the storage function unit 122. Each function of the control function unit 150 may be realized using an application specific integrated circuit (ASIC) designed to realize the function.

Modification Example 12

In the above embodiments, the configuration of the image display unit is illustrated. However, the configuration of the image display unit can be arbitrarily determined without departing from the gist of the invention, and for example, addition, deletion, conversion, or the like of the constituent elements can be made.

Figure 22:
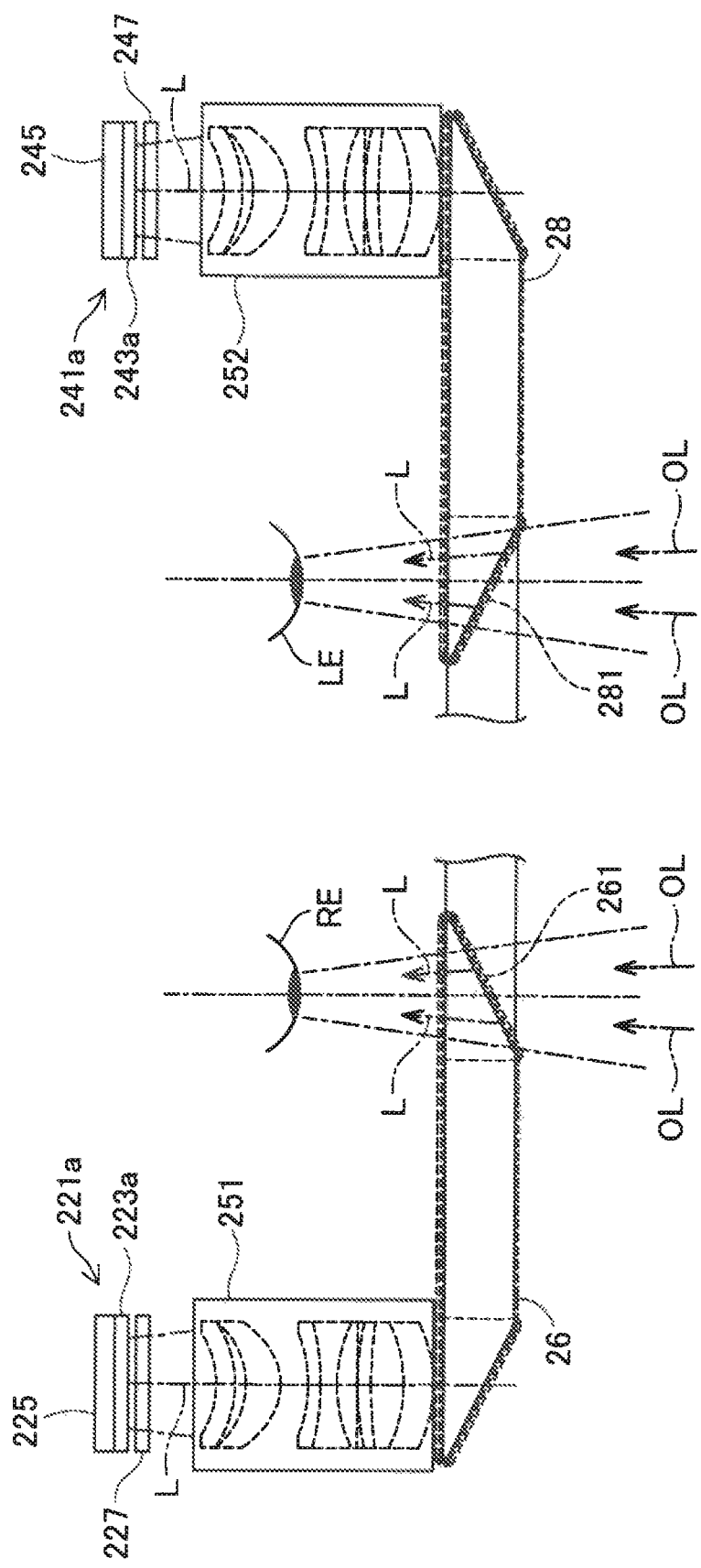
FIG. 22 is a plan view of a main part illustrating a configuration of an optical system included in an image display unit of a modification example.

FIG. 22 is a plan view of a main part illustrating a configuration of an optical system included in an image display unit of a modification example. An OLED unit 221a corresponding to the user's right eye RE and an OLED unit 241a corresponding to the left eye LE are provided in the image display unit of the modification example. The OLED unit 221a corresponding to the right eye RE includes an OLED panel 223a coloring white, an OLED drive circuit 225 driving the OLED panel 223a to emit light. A modulation element 227 (modulation device) is disposed between the OLED panel 223a and the right optical system 251. The modulation element 227 is formed of, for example, a transmissive liquid crystal panel, and modulates the light emitted by the OLED panel 223a to generate the image light L. The image light L that is modulated by passing through the modulation element 227 is guided to the right eye RE by the right light guide plate 26.

The OLED unit 241a corresponding to the left eye LE includes an OLED panel 243a emitting white color, an OLED drive circuit 245 driving the OLED panel 243a to emit light. A modulation element 247 (modulation device) is disposed between the OLED panel 243a and the left optical system 252. The modulation element 247 is formed of, for example, a transmissive liquid crystal panel, and modulates the light emitted by the OLED panel 243a to generate the image light L. The image light L that is modulated by passing through the modulation element 247 is guided to the left eye LE by the left light guide plate 28. The modulation elements 227 and 247 are connected to a liquid crystal driver circuit which is not illustrated. The liquid crystal driver circuit (modulation device driving unit) is mounted on, for example, a substrate disposed in the vicinity of the modulation elements 227 and 247.

According to the image display unit of the modification example, the right display unit 22 and the left display unit 24 are respectively configured with image elements including the OLED panels 223a and 243a as light source sections, and modulation elements 227 and 247 that modulate light emitted from the light source sections to output image light including a plurality of color lights. The modulator that modulates the light emitted from the OLED panels 223a and 243a is not limited to a configuration adopting a transmissive liquid crystal panel. For example, a reflective liquid crystal panel may be used, a digital micro mirror device may be used, or a laser retinal projection type HMD 100 may be used, instead of the transmissive liquid crystal panel.

In the above embodiments, the glasses-type image display unit 20 has been described, but the aspect of the image display unit 20 can be arbitrarily changed. For example, the image display unit 20 may be worn like a hat, or may be incorporated in a body armor such as a helmet. Further, the image display unit 20 may be configured as a head up display (HUD) mounted on a vehicle such as an automobile or an airplane or other transportation means.

In the above embodiments, a configuration is exemplified in which a virtual image is formed by the half mirrors 261 and 281 on a part of the right light guide plate 26 and the left light guide plate 28, as an optical system that guides image light to the eye of the user. However, this configuration can be arbitrarily changed. For example, a virtual image may be formed in the area occupying the entire surface (or most portion) of the right light guide plate 26 and the left light guide plate 28. In this case, the image may be reduced by the operation of changing the display position of an image. In addition, the optical element according to the invention is not limited to the right light guide plate 26 and the left light guide plate 28 having the half mirrors 261 and 281, and an arbitrary aspect can be adopted as long as it uses optical components that input image light to the eye of the user (for example, a diffraction grating, a prism, a holography, or the like).

The invention is not limited to the above-described embodiments, examples, and modification examples, and can be realized in various configurations without departing from the spirit thereof. For example, the technical features of the embodiments, examples, and modification examples corresponding to the technical features of each aspect described in the summary of invention section can be replaced or combined as appropriate, in order to solve some or all of the above-mentioned problems, or in order to achieve some or all of the aforementioned effects. Unless its technical features are described as essential herein, they can be deleted as appropriate.

The entire disclosure of Japanese Patent Application No. 2016-224597, filed Nov. 18, 2016 is expressly incorporated by reference herein.

What is claimed is:
1. A head mounted display comprising:
a display unit that displays an image;
a first vibrator;
a second vibrator;

a third vibrator; and
a controller that controls the first vibrator, the second vibrator and the third vibrator based on a plurality of vibration patterns;
wherein
the second vibrator is disposed on between the first vibrator and the third vibrator in a left-right direction of the head mounted display,
the controller selects a first vibration pattern among the plurality of vibration patterns by information that includes a direction and a location of the head mounted display, the direction is a direction of a front of a user,
the controller executes the first vibration pattern,
the first vibration pattern including:
a first step that vibrates the first vibrator;
a second step that stops the first vibrator after the first step;
a third step that vibrates the second vibrator after the second step;
a fourth step that stops the second vibrator after the third step;
a fifth step that vibrates the third vibrator after the fourth step;
a sixth step that stops the third vibrator after the fifth step; and
a seventh step that vibrates the first vibrator after the sixth step.

2. The head mounted display according to claim 1,
wherein the information includes an information of a turning corner which is obtained from a route searched by a route search of a navigation device and the location of the head mounted display.

3. The head mounted display according to claim 1,
wherein the information includes a direction of a wireless communication device which is obtained from a location of the wireless communication device performing wireless communication with the head mounted display and the location of the head mounted display and the direction based on the location of the head mounted display,
the controller selects a second vibration pattern among the plurality of vibration patterns by the information,
the controller executes the second vibration pattern,
the second vibration pattern vibrates one of the first vibrator, the second vibrator, or the third vibrator.

4. The head mounted display according to claim 1,
wherein
the controller selects a second pattern among the plurality of vibration patterns by an input operation from the user,
the controller executes the second vibration pattern,
the second vibration pattern vibrates one of the first vibrator, the second vibrator, or the third vibrator.

5. The head mounted display according to claim 4,
wherein the display unit displays an input item for receiving the input operation from the user.

6. The head mounted display according to claim 4,
wherein the input operation is an operation to switch a movement direction of an operation element.

7. The head mounted display according to claim 1,
wherein the head mounted display has a glasses shape,
wherein the second vibrator is provided in a nose pad part,
wherein the first vibrator is provided in a right-side end piece portion, and
wherein the third vibrator is provided in a left-side end piece portion.

8. The head mounted display according to claim 1,
wherein the head mounted display has a glasses shape,
wherein the first vibrator is provided in a right-side temple portion, and
wherein the third vibrator is provided in a left-side temple portion.

9. A control method of a head mounted display including a display unit that displays an image, a first vibrator, a second vibrator, and a third vibrator,
the second vibrator disposing on between the first vibrator and the third vibrator in a left-right direction of the head mounted display,
the control method comprising:
selecting a first vibration pattern among the plurality of vibration patterns by an information that includes a direction and a location of the head mounted display, the direction is direction of a front of a user, and
executing the first the vibration pattern,
wherein the first vibration pattern includes:
a first step that vibrates the first vibrator;
a second step that stops the first vibrator after the first step;
a third step that vibrates the second vibrator after the second step;
a fourth step that stops the second vibrator after the third step;
a fifth step that vibrates the third vibrator after the fourth step;
a sixth step that stops the third vibrator after the fifth step; and
a seventh step that vibrates the first vibrator after the sixth step.

10. A nonvolatile computer readable medium storing a computer program for controlling a head mounted display including a display unit that displays an image, a first vibrator, a second vibrator, and a third vibrator, the program causing a computer to realize a function,
the second vibrator disposing on between the first vibrator and the third vibrator in a left-right direction of the head mounted display,
wherein the function includes
a function of selecting a first vibration pattern among the plurality of vibration patterns by an information that includes a direction and a location of the head mounted display, the direction is direction of a front of a user,
a function of executing the first vibration pattern,
the first vibration pattern including:
a first step that vibrates the first vibrator;
a second step that stops the first vibrator after the first step;
a third step that vibrates the second vibrator after the second step;
a fourth step that stops the second vibrator after the third step;
a fifth step that vibrates the third vibrator after the fourth step;
a sixth step that stops the third vibrator after the fifth step; and
a seventh step that vibrates the first vibrator after the sixth step.

11. The head mounted display according to claim 2,
wherein
the display unit displays a rote image by the information.

12. The head mounted display according to claim 1,
wherein
the head mounted display has a glasses shape,
the second vibrator is provided in a nose pad part, the third vibrator is provided in a right-side end piece portion, and the first vibrator is provided in a left-side end piece portion.

13. The head mounted display according to claim 1, wherein the head mounted display has a glasses shape, the third vibrator is provided in a right-side temple portion, and the first vibrator is provided in a left-side temple portion.

* * * * *